PROJECTION SYSTEM INCLUDING CONVERTING POINTS IN A THREE-DIMENSIONAL COORDINATE SYSTEM TO TWO-DIMENSIONAL PLANAR PROJECTIONS
Filed Feb. 23, 1960 15 Sheets-Sheet 1
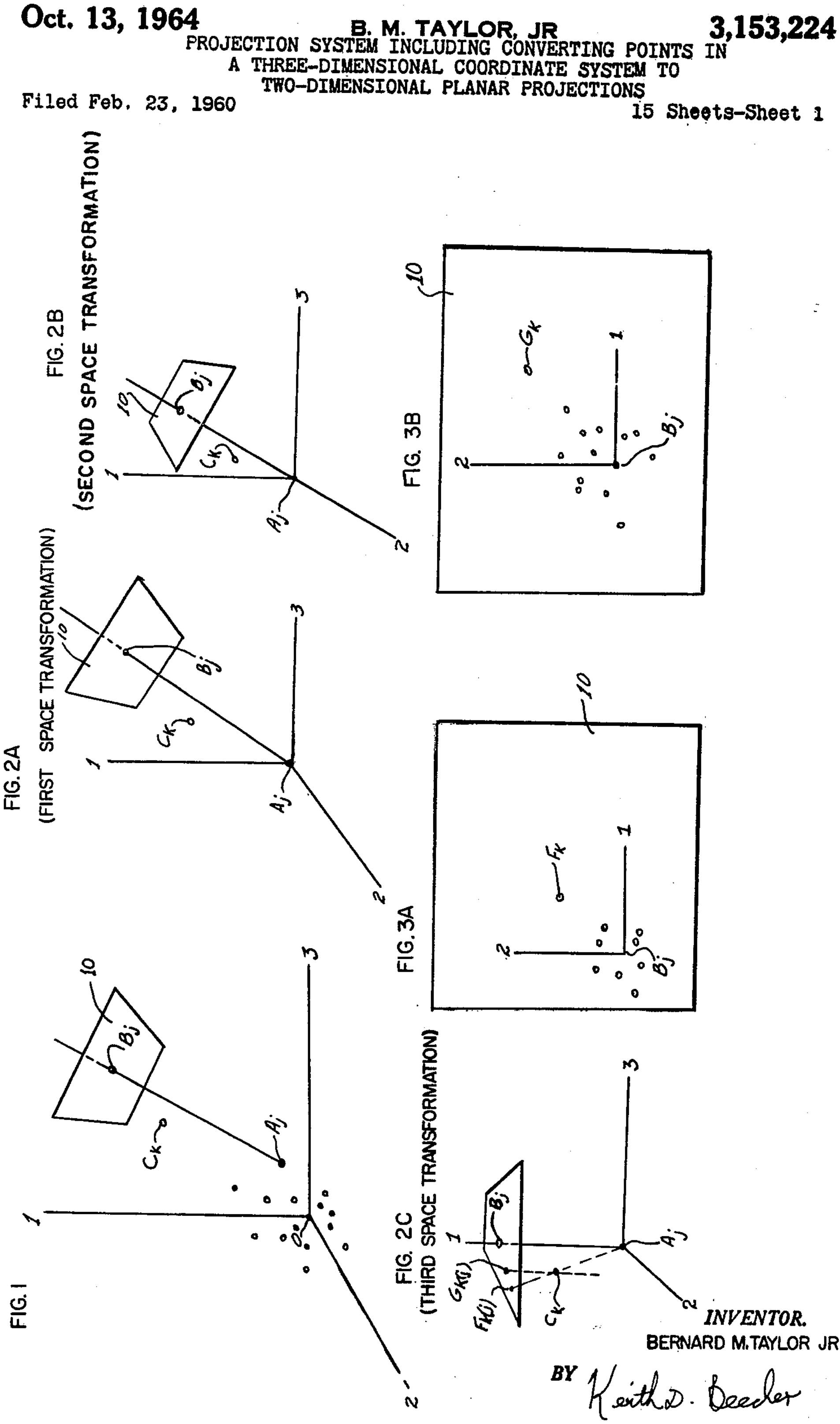
FIG. 1, FIG. 2A (FIRST SPACE TRANSFORMATION), FIG. 2B (SECOND SPACE TRANSFORMATION), FIG. 2C (THIRD SPACE TRANSFORMATION), FIG. 3A, FIG. 3B
INVENTOR.
BERNARD M. TAYLOR JR.
BY Keith D. Beecher
ATTORNEY Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960 15 Sheets-Sheet 2

INVENTOR
BERNARD M. TAYLOR, JR.

BY Keith D Beecher

ATTORNEY

Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960 15 Sheets-Sheet 3

INVENTOR.

BY

MOTOR DRIVEN SWITCHING CAMSHAFT

SWITCHING CAMS' TIMING (CON"T)

Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960 15 Sheets-Sheet 7

FIG. 12 $\gamma_1$— INPUT BUFFER
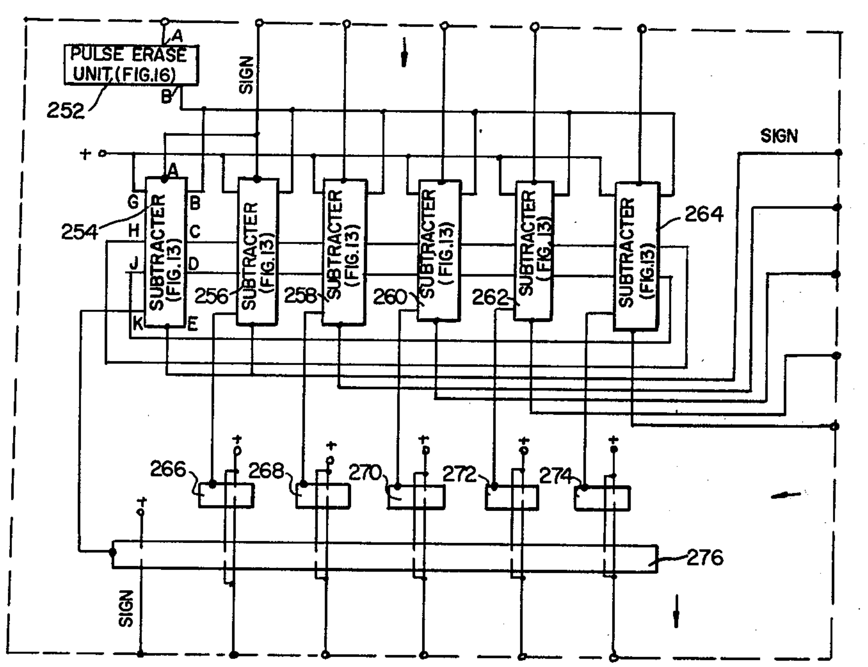
FIG. 13 SUBTRACTER 254
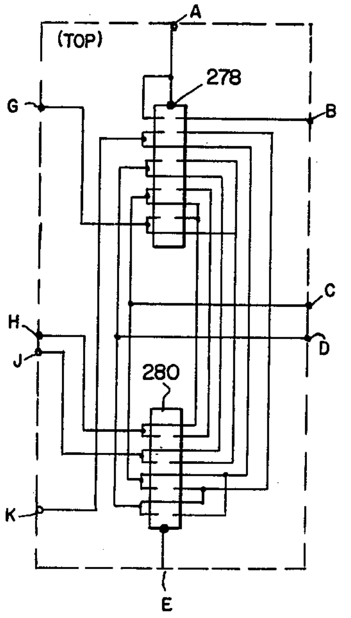
FIG. 16 PULSE ERASE UNIT 252
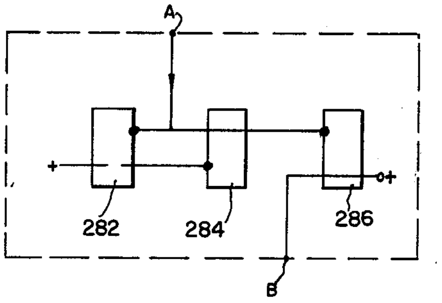

Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960 15 Sheets-Sheet 10

Oct. 13, 1964 B. M. TAYLOR, JR 3,153,224

PROJECTION SYSTEM INCLUDING CONVERTING POINTS IN
A THREE-DIMENSIONAL COORDINATE SYSTEM TO
TWO-DIMENSIONAL PLANAR PROJECTIONS

Filed Feb. 23, 1960 15 Sheets-Sheet 11

PARALLEL ADDER 136

ONES-COMPLEMENT TO SIGNED ABSOLUTE
CONVERSION UNIT-384-

CONVERTER-COMPLEMENTER REGISTER-138-

Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960 15 Sheets-Sheet 14

Oct. 13, 1964 B. M. TAYLOR, JR 3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Filed Feb. 23, 1960

15 Sheets-Sheet 15

3,153,224

PROJECTION SYSTEM INCLUDING CONVERTING POINTS IN A THREE-DIMENSIONAL COORDINATE SYSTEM TO TWO-DIMENSIONAL PLANAR PROJECTIONS

Bernard M. Taylor, Jr., 1167 Old Topanga Road, Topanga Canyon, Calif.

Filed Feb. 23, 1960, Ser. No. 10,125
16 Claims. (Cl. 340—172.5)

The present invention relates generally to an improved system and apparatus for converting points in a 3-space coordinate system into corresponding 2-space planar projections. The invention more particularly relates to an improved pictorial projection system for transferring 3-space Cartesian coordinates of an arbitrarily selected array of points into the corresponding planar coordinates of the projections of the array of points in a selected plane as viewed from a selected position in space.

By the practice of the present invention, isometric, diametric, trimetric, parallel perspective, angular perspective, oblique perspective, and other projections of groups of points, mapped contours, warped surfaces, amorphous solids and so on, may be obtained. Moreover, the system of the invention may be used for illustrating topological expressions, statistical contours, and multi-dimensional spaces. The system of the invention also has utility for the stereo-optical visualization of atmospheric conditions, underwater strata, configurations from borings into the earth, etc. The system also may be used in experimental film, painting and other fine art applications. The invention also has many other applications which are too numerous to list.

Among the fields of endeavor in which the application of the invention finds particular utility are the following: architectural rendering, interior design, advertising illustration, technical industrial production drawings, installation and service instructions, piping and wiring diagrams; text and catalog illustration; and many others.

The contours and configurations referred to in the preceding paragraphs may be represented by a group of points in three dimensional space. Also, and in a manner well known to the art, each of these points may be represented by three Cartesian coordinates in a selected 3-space coordinate system. These coordinates index each of the points with respect to the selected 3-space coordinate system, and which has an arbitrarily selected origin. The system of the present invention utilizes the 3-space Cartesian coordinates of each of the points and converts these coordinates to corresponding planar coordinates. The planar coordinates refer to the projection of each of the points in 3-space into a selected picture plane as viewed from a selected observation point. The resulting projection may be perspective or orthographic, with the necessary planar coordinates for both types of projections being simultaneously provided by the embodiment of the invention to be described.

As noted above, all types of orthographic projections in a selected picture plane can be provided. These include auxiliary, or axonometric (for example, three sides of a cube being visible), or parallel (one side of a cube being visible). The different species of axonometric projections can also be obtained, including trimetric, diametric and isometric. The system of the invention is also capable of providing the different varieties of the usual perspective projections, including, parallel perspective, angular perspective or oblique perspective.

The art of pictorial projection of an object in three dimensional space into a selected 2-space picture plane by geometrical construction, as it is universally practiced today, was developed in its fundamental principles about 2500 years ago. The two basic types of pictorial projection are (1) orthographic and (2) perspective. In both these types of construction the projections are carried out by the so-called parallel, angular, or oblique planar projection of rectangular solids.

Prior to the present invention the projection of non-rectangular objects, surfaces, or contours, into a 2-space representation required an extremely high degree of skill and dexterity on the part of the draftsman, and many such projections were considered impossible to achieve with any degree of accuracy. Even the prior art methods of projecting elementary cubes required carefully trained draftsmen, having a full understanding of the theory and of the many aspects of projection representations. Because of this, the rendering of perspective and orthographic drawings has long been considered a difficult and most expensive operation.

Attempts have been made in recent years to devise instrumentalities and mechanisms to assist the draftsman in rendering perspective and orthographic drawings. These mechanisms, i.e., perspective drafting machines, are analog machines characterized by sliding bars, revolving gears, rotating cylinders, moving pointers and optical levers. Such a machine may be capable of making arbitrary perspective drawings from correctly scaled and accurately manipulated plan and elevation drawings, with station point and line of sight entered mechanically under the draftsman's control as the projection's parameters and with 3-space points on the prepared input drawings marked off with levers, and corresponding 2-space output points (coordinates) pointed out by a moving pointer. These mechanisms, however, have met with but limited commercial success. This lack of widespread acceptance of the prior art mechanisms has been due mainly to their complexity and cost, and also because of the difficulties encountered by draftsmen in mastering their operation.

It is, accordingly, an important object of the present invention to provide an improved system for enabling perspective and orthographic projections to be rendered, and to provide such a system and apparatus which is relatively low in cost, relatively small in size; and one which may be operated simply so that all the variety of pictorial projections may be provided of complex objects and contours and without the concomitant requirement of any particular skill or talent on the part of the draftsman.

An important feature of the system and apparatus of the invention is its ability to project the 3-space Cartesian coordinates of each of a plurality of points in a selected swarm into their equivalents in any selected picture plane; and to make these projections with reference to an observer positioned at any particular point in space and looking at any particular point in that plane.

The system and apparatus of the invention is most advantageous in that it is uniquely capable of providing all the necessary information for the projection of an image of any object in space having any complex configuration. This enables the object to be projected into a picture plane which may have any desired location with respect to an observer positioned at any desired location in space.

The use of the apparatus and system of the invention permits a relatively unskilled draftsman, having no particular or specialized training in drafting techniques and theories, to plot accurately and precisely any type of perspective or orthographic projection, in any selected picture plane, as observed from any arbitrarily chosen position. In addition, it permits such a person to plot precise projections of the most complex non-rectangular, objects, surfaces, contours, or even arbitrarily located groups of points in space.

In the drawing:

FIGURE 1 is a diagrammatic representation of an array of arbitrarily located points in an arbitrarily selected 3-space Cartesian system; this representation being useful in explaining the operation of the system of the invention;

FIGURES 2A–2C are diagrammatical illustrations of an observer arbitrarily positioned in space, and of a center line extending from the observer in perpendicular relationship with a selected picture plane on which projections from the points of FIGURE 1 are to be plotted, and showing the space transformations which are made to bring the picture plane into a proper relationship with the observer so as to receive the projections;

FIGURE 3A is a diagrammatic representation of a planar coordinate system illustrating the perspective projections of the points of FIGURE 1 into the selected picture plane of FIGURE 2;

FIGURE 3B is a diagrammatic of representation of a planar coordinate system illustrating orthographic projections of the points of FIGURE 1 into the selected picture plane;

FIGURE 12 is an input buffer used in the calculator system of FIGURE 10A;

FIGURE 13 is a subtractor circuit used in the input buffer of FIGURE 12;

FIGURE 16 is a pulse erase unit used in the circuitry of FIGURE 12, for example;

Figure 4:
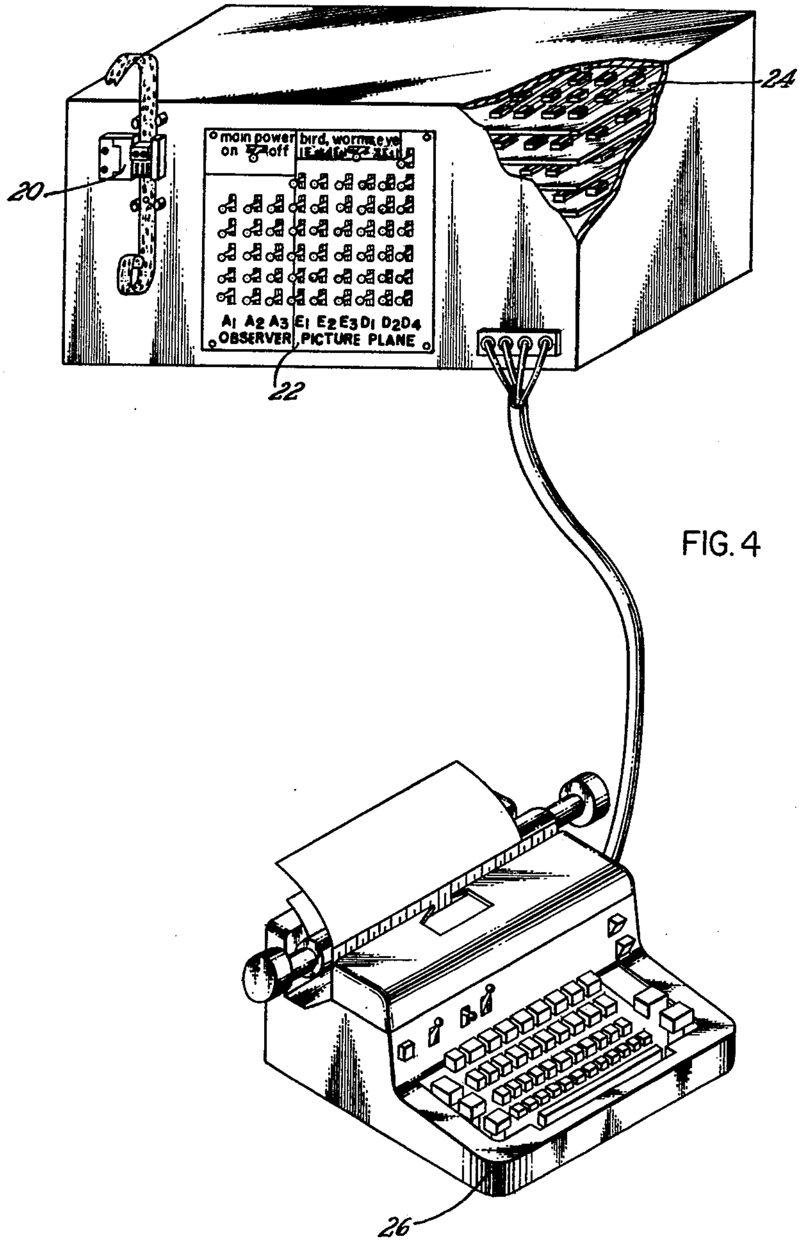
FIGURE 4 is a pictorial perspective representation of suitable apparatus which may be constructed in accordance with the concepts of the invention so as to practice the invention.

Reference will now be made to FIGURES 1, 2A, 2B, 2C, 3A and 3B for a theoretical discussion of the principles underlying the rendering of perspective and orthographic projections by means of the transposition and conversion of 3-space coordinates into planar coordinates in a selected plane.

Each of the points represented in the swarm of FIGURE 1 may be indexed in known manner and by known instrumentalities in three-dimensional space by corresponding Cartesian coordinates, and this indexing may be with respect to three mutually perpendicular coordinates axes 1, 2 and 3, the origin O of these axes having an arbitrarily selected position in space. The array of points in FIGURE 1 may respectively correspond to certain identifying parts of the contour of an identified object which is to be projected in the selected picture plane.

Each of the points in three-dimensional space in FIGURE 1 may be projected in any given plane. The orthographic projection of any such point in a given plane, for example, is the position of the foot of the perpendicular dropped from that point in the given plane. The perspective projection of the point in the given plane, on the other hand, is the vector drawn through that point and the observation point.

In the practice of the invention, the draftsman considers each of the three-dimensional objects to be projected in the selected plane as a different group of independent points. The points in the group are then identified and referenced to an arbitrarily selected Cartesian 3-space coordinate system. These points, for example, may be those represented in the swarm of FIGURE 1. The draftsman, by well known means, records the important points in the group by their 3-space coordinates referenced to the selected coordinate system. These points must be carefully selected with due regard to economy of selection, and yet in sufficient numbers to provide a projection of the object under consideration having a desired sufficiency of detail.

An arbitrary index is then assigned to each selected point, and the 3-space coordinates of each point are tabulated. The three coordinates of any *k*th member $C_k$ of the group in FIGURE 1 will be referred to as $c_{1k}$, $c_{2k}$, $c_{3k}$. An identification "*i*" is also applied to the group itself.

For purposes of explanation, therefore, it is assumed that the plurality of points in FIGURE 1 is any *i*th group of stationary Cartesian points in three-dimensional space. Also located in space is any *j*th observer A, and any *j*th picture center $B_j$. This permits the construction of a *j*th picture plane 10 through the center of picture $B_j$ and perpendicular to the vector $A_jB_j$.

Then any *k*th point $C_k$ in the *i*th group of FIGURE 1 may be seen by the perspective observer as the *k*th point $F_k$ of a two-space array in the picture plane 10 (FIGURE 3A). Planar coordinates may then be assigned for the point $F_k$ using $B_j$ as the origin for the planar coordinate system (FIGURES 2A–2C). In like manner, the *k*th member $C_k$ in the three-dimensional space array of points in FIGURE 1 may be seen by the orthographic observer (moved back to infinity on the line of sight $A_jB_j$) as the *k*th point $G_k$ of a 2-space array in the picture plane 10 (FIGURE 3B).

The system and apparatus of the present invention is constructed to convert the 3-space coordinates of each of the points in FIGURE 1 into the planar coordinates of the corresponding points in FIGURES 3A and 3B, and to accomplish this on the basis of parameters representing the location of the observer point $A_j$ and the center of picture point $B_j$. This conversion is made in the embodiment to be described by three space transformations shown in FIGURES 2A–2C.

The system of the invention in computing the planar coordinates for the points in FIGURES 3A and 3B is, preferably, constructed to meet the following requirements; (1) output scalars are parsimoniously arithmetized in terms of the input scalars; (2) any *k*th square roots and trigonometric functions are eliminated; (3) every *j*th order of space transformation is optimized in terms of precision in the output, and indeterminate transformations are eliminated; and (4) the outputs from the system represent only points in the forward region between the observation point and the projection plane.

The function of the projection system of the invention is to provide easily plotted analytic outputs, to eliminate traditional drafting table geometric constructions of pictorial drawings from design or engineering specifications. The correct mathematics for analytical projection both axonometric and perspective, in general form with the picture plane and observer given as parameters, has evidently never been published by mathematicians previously and presumably never has been previously resolved. It is necessary for the feasibility of the projection system of this invention that generally applicable algebraic expressions for the two-dimensional coordinates of the projected points be derived, in terms of the projection parameters and three dimensional coordinates of the point projected, so that the projections may be performed by electric current flowing into and out of relatively simple combinations of known electrical components, assembled on the basis of the algebraic expressions which the derivations yield.

Therefore, the initial solution of the correct and most parsimonious projection equations removes the largest obstacle to the fabrication of a simple and inexpensive projection system, which system embodies the concepts of the present invention. The algebra for these projection expressions is given below. Manipulations of the input matrix, containing a given projection's parameters' two point vectors and a single *k*th projected point vector, are shown to yield the required algebraic expressions. To make elements zero, three unique interim space transformations are performed by algebra, although performing the projections by the system of the invention is not mathematically dependent upon executing the transformations. The projections may be made, for example, by vector and tensor manipulations without executing any space transformations.

Moreover, the electrical projection system of the invention itself performs the projections without performing the space transformations shown in the following derivations. The pictorial projection system to be described contains an exceedingly simple arithmetic system, specialized for the task of pictorial projection.

The projection system to be described is extremely slow in its operation, relative to an electronic digital computer of present day design. However, the system to be described may be embodied, for example, into a portable office projection machine to be used extemporaneously on a real-time basis by groups of draftsmen.

In general, the factors and considerations to be enumerated in conjunction with the embodiment of the invention to be described permit the system of the invention to be embodied in a light, compact, economical and easy to operate unit.

The following discussion is directed chiefly to the constructions and transformations necessary for perspective projection. It will be understood that similar principles are applied to orthographic projections.

In the conversion from the 3-space representation of an array of points into a 2-space projected representation in a selected picture plane, three space transformations are made after an original indexing of the points in the selected swarm. The original indexing operation is to index all the 3-space points in the selected swarm and the selected observation point and the center of the selected picture plane, to an arbitrarily selected 3-space coordinate system as shown in FIGURE 1. The first space transformation is to shift the 3-space coordinate system so that the observation point ($A_j$) is located at the origin (FIGURE 2A).

The second space transformation is effective to shift the coordinate system angularly about the $A_j2$ axis so as to reduce the "2" coordinate of the center ($B_j$) of the picture plane 10 to zero (FIGURE 2B). The third space transformation is effective to rotate the 3-space coordinate system about the $A_j3$ axis also to bring the "3" coordinate of the center ($B_j$) of the picture plane 10 to zero (FIGURE 2C). As shown in FIGURE 2C, the picture plane 10 is now in position to receive the perspective projection $F_k$ of the point $C_k$, or the orthographic projection $G_k$ of that point.

In the perspective projection in the *j*th picture plane 10 of FIGURES 1, 2A–2C, 3A, for example, $$(A_j, B_j, C_k)_k \rightarrow [F_k(_j)](_i)$$

The vectors $A_j$ and $B_j$ are parametric with respect to $C_k$ and $F_{k(j)}$, and an appropriate perspective projection of the *i*th 3-space point into its *j*th 2-space point may be effected by the following space transformations:

MATRIX I $$\text{I}\begin{bmatrix} a_{1j(i)}, & b_{1j(i)}, & c_{1k(i)} \\ a_{2j(i)}, & b_{2j(i)}, & c_{2k(i)} \\ a_{3j(i)}, & b_{3j(i)}, & c_{3k(i)} \end{bmatrix}$$

where matrix I is the original input with reference to the 3-space coordinate system of FIGURE 1; where:

$$A\begin{bmatrix} a_1 \\ a_2 \\ a_3 \end{bmatrix}$$

are coordinates of the observer $A_j$ with respect to 0 in FIGURE 1.

$$B\begin{bmatrix} b_1 \\ b_2 \\ b_3 \end{bmatrix}$$

are coordinates of the center $B_j$ of the picture plane 10 with respect to 0 in FIGURE 1.

$$C\begin{bmatrix} c_1 \\ c_2 \\ c_3 \end{bmatrix}$$

are the coordinates of the *k*th member $C_k$ of the array with respect to 0 in FIGURE 1.

MATRIX II $$\text{II}\begin{bmatrix} a_1-a_1 & b_1-a_1 & c_1-a_1 \\ a_2-a_2 & b_2-a_2 & c_2-a_2 \\ a_3-a_3 & b_3-a_3 & c_3-a_3 \end{bmatrix}$$

$$\text{II}\begin{bmatrix} 0 & -e_{1j} & -\gamma_{1k\ i} \\ 0 & -e_{2j} & -\gamma_{2k\ i} \\ 0 & -e_{3j} & -\gamma_{3k\ i} \end{bmatrix}_{(i)}$$

where matrix II is the first space transformation in which the observer A is made the origin of the 3-space coordinate system of FIGURE 2A.

$$A\begin{bmatrix} 0 \\ 0 \\ 0 \end{bmatrix}$$

are the new 3-space coordinates of the observer $A_j$.

$$B\begin{bmatrix} -e_1=b_1-a_1 \\ -e_2=b_2-a_2 \\ -e_3=b_3-a_3 \end{bmatrix}$$

are the new 3-space coordinates of the center of the picture plane $B_j$.

$$C\begin{bmatrix} -\gamma_1-c_1-a_4 \\ -\gamma_2=c_2-a_2 \\ -\gamma_3=c_3-a_3 \end{bmatrix}$$

are the new 3-space coordinates of the *k*th member $C_k$ of the group of points in FIGURE 1.

MATRIX III $$\text{III}\begin{bmatrix} 0 & \sqrt{(b_1-a_1)^2+(b_2-a_2)^2} & \dfrac{(c_2-a_2)(b_2-a_2)+(c_1-a_1)(b_1-a_1)}{\sqrt{(b_1-a_1)^2+(b_2-a_2)^2}} \\ 0 & 0 & \dfrac{(c_2-a_2)(b_1-a_1)-(c_1-a_1)(b_2-a_2)}{\sqrt{(b_1-a_1)^2+(b_2-a_2)^2}} \\ 0 & b_3-a_3 & c_3-a_3 \end{bmatrix}$$

$$\text{III}\begin{bmatrix} 0 & d_{2j(i)} & \dfrac{\omega_{k(ij)}}{d_{2j(i)}} \\ 0 & 0 & \dfrac{\rho_{k(ij)}}{d_{1j(i)2}} \\ 0 & -e_{3j(i)} & -\gamma_{3k(ij)} \end{bmatrix}$$

where matrix III is the second space transformation of FIGURE 2B in which the 2 coordinate of $B_j$ is reduced to 0.

This is provided that such point $C_{k(i)}$ lies far enough in front of the $j$th within the $i$th observer's eye.

To perform the perspective projection properly with a computer, certain requirement must be made. These, as noted above, include the following:

(A) The output scalars should be parsimonously arithmetized in terms of the input scalars in $A_{j(i)}$, $B_{j(i)}$ and $C_{k(i)}$;

(B) Any $k$th square roots and trigonometric functions should be eliminated;

MATRIX IV $$\text{IV}\begin{bmatrix} 0 & \sqrt{(a_1-b_1)^2+(a_2-b_2)^2+(a_3-b_3)^2} & \dfrac{(a_1-b_1)(a_1-c_1)+(a_2-b_2)(a_2-c_2)+(a_3-b_3)(a_3-c_3)}{\sqrt{(a_1-b_1)^2+(a_2-b_2)^2+(a_3-b_3)^2}} \\ 0 & 0 & \dfrac{(a_1-b_1)(a_2-c_2)-(a_1-c_1)(a_2-b_2)}{(a_1-b_1)^2+(a_2-b_2)^2} \\ 0 & 0 & \dfrac{(a_3-b_3)[(a_1-b_1)(a_1-c_1)+(a_2-b_2)(a_2-c_2)]-(a_3-c_3)\sqrt{(a_1-b_1)^2+(a_2-b_2)^2}}{\sqrt{(a_1-b_1)^2+(a_2-b_2)^2+(a_3-b_3)^2}} \end{bmatrix}$$

$$\text{IV}\begin{bmatrix} 0 & d_{1j(i)} & \dfrac{\lambda_{k(ij)}}{d_{1j(i)}} \\ 0 & 0 & \dfrac{\rho_{k(ij)}}{d_{1j(i)}^2} \\ 0 & 0 & \dfrac{\sigma_{k(ij)}}{d_{1j(i)}^2} \end{bmatrix}$$

where matrix IV is the third space transformation of FIGURE 2C in which the 3 coordinate of $B_j$ is also reduced to 0.

(C) Every $j$th order of space transformations should be optimized in terms of precision in the output, and indeterminate transformations must be avoided;

(D) Only points in front of the observer's eye may be projected.

In addition to the basic requirements listed above, certain artistic requirements must also be met. These include the following:

(A) The computer must accommodate random arrays of points selected arbitrarily by the draftsman;

(B) The points must be easily identified after they are projected in the selected plane;

MATRIX V $$\text{V}\begin{bmatrix} \dfrac{\sqrt{(a_1-b_1)^2+(a_2-b_2)^2+(a_3-b_3)^2}\left[\dfrac{(a_3-b_3)[(a_1-b_1)(a_1-c_1)+(a_2-b_2)(a_2-c_2)]}{\sqrt{(a_1-b_1)^2+(a_2-b_2)^2}}\right]-(a_3-c_3)\sqrt{(a_1-b_1)^2+(a_2-b_2)^2}}{(a_1-b_1)(a_1-c_1)+(a_2-b_2)(a_2-c_2)+(a_3-b_3)(a_3-c_3)} \\ \dfrac{[(a_1-b_1)^2+(a_2-b_2)^2+(a_3-b_3)^2][(a_1-b_1)(a_2-c_2)-(a_2-b_2)(a_1-c_1)]}{\sqrt{(a_1-b_1)^2+(a_2-b_2)^2}[(a_1-b_1)(a_1-c_1)+(a_2-b_2)(a_2-c_2)+(a_3-b_3)(a_3-c_3)]} \end{bmatrix}$$

$$\text{V}\begin{bmatrix} \dfrac{\sigma_{k(ij)}}{\lambda_{k(ij)}} \\ \dfrac{\rho_{k(ij)}}{\lambda_{k(ij)}} \end{bmatrix} = \begin{bmatrix} f_{1k(j)} \\ f_{2k(j)} \end{bmatrix}_{(i)}$$

where matrix V is the perspective projection of the $k$th point $C_k$ in the picture plane 10 (FIGURES 2C, 3A).

The theory of perspective projection may be summed up in the following manner. Given any $i$th swarm of stationary Cartesian points in the three-space, as shown in FIGURE 1, together with any $j$th—within the $i$th observer $A_{j(i)}$, and a $j$th—within the $i$th center of interest $B_{j(i)}$, which allow the construction of a $j$th—within the $i$th picture plane through $B_{j(i)}$ and normal to the line of sight $A_{j(i)}$ and $B_{j(i)}$, as also shown in FIGURE 1; then, any $k$th—within the $i$th point $C_{k(i)}$ in the swarm may be seen by the observer as the $k$th—within the $j$th within the $i$th point $F_{k(j(i))}$ in a two-space array in the picture plane, on which planar orthogonal coordinates may be drawn using $B_{j(i)}$ as origin, as shown in FIGURE 3A.

(C) Any array of point should allow many different $j$th projections without requiring the draftsman in the operation of the computer to re-record $k$th points in the array for every $j$th observer.

The above requirements are mutually compatible. However, two additional requirements which may arise may be mutually exlusive. These are:

(A) The external calculations of inputs made by the draftsman should be minimized to make the use of the unit completely direct.

(B) The internal accessory machine calculations of the $j$th ($i$th) parameters ought to be minimized for practical economy purposes in the construction of the computer.

The algebra of the perspective and orthographic projections may be briefly repeated as follows:

(1) The analytic inputs in the three-space system are $A_{j(i)}$, $B_{j(i)}$ and $C_{k(i)}$ $$\begin{bmatrix} a_1 & a_2 & a_3 \\ b_1 & b_2 & b_2 \\ c_1 & c_2 & c_3 \end{bmatrix}$$

The perspective projection of the $C_{k(i)}$ yields $F_{k(j(i))}$ with $A_{j(i)}$ at the origin (0, 0):

$$\begin{bmatrix} 0 & 0 \\ 0 & 0 \\ f_1 & f_2 \end{bmatrix}$$

where:

If one term is different, a diametric projection is obtained; if all three are different, a trimetric projection is obtained. Heretofore, trimetric projections have been practiced only rarely because of the difficulty of drafting table construction for such projections. The present invention enables trimetric projections to be obtained as readily as any of the others.

$$f_1=\frac{\sqrt{(a_1-b_1)^2+(a_2-b_2)^2}\,[(a_3-b_3)][(a_1-b_1)(a_1-c_1)+(a_2-b_2)(a_2-b_2)]]-(a_3-c_3)\sqrt{(a_1-b_1)^2+(a_2-b_2)^2}}{(a_1-b_1)(a_1-c_1)+(a_2-b_2)(a_2-c_2)+(a_3-b_3)(a_3-c_3)}$$

$$f_2=\frac{[(a_1-b_1)^2+(a_2-b_2)^2+(a_3-b_3)^2]\,[(a_1-b_1)(a_2-c_2)-(a_2-b_2)(a_1-c_1)]}{\sqrt{(a_1-b_1)^2+(a_2-b_2)^2}\,[(a_1-b_1)(a_1-c_1)+(a_2-b_2)(a_2-c_2)+(a_3-b_3)(a_3-c_3)]}$$

The rotation of coordinates on the two-space is optimized in these expressions, and is inconsequential to the draftsman. The units of measurement in the three-space are preserved in the two-space. The horizon is the straight line passing through all $F_{k(j(i))}$ points whose $C_{3k(i)}=A_{3j(i)}$.

Vanishing points are useful and real, and they occur for every projected family of parallel lines which are parallel to the picture plane. For example, an elementary rectangular solid may have 1, 2 or 3 vanishing points. Using simple rules, the advancing points relative given $A_{j(i)}$ may be introduced physically as special $C_{k(i)}$ by the draftsman.

Points to the rear of the observer's eye $A_{j(i)}$ may be recognized by the fact that for all such points the denominator $(a_1-b_1)+(a_1-c_1)+(a_2-b_2)(a_2-c_2)+(a_3-b_3)(a_3-c_3)$ is negative.

When the distance $\sqrt{(a_1-b_1)^2+(a_2-b_2)^2}$ is zero or small, the projection becomes indeterminate. This is rectified in the computer by trading coordinates in the three-space system by means of a left full cycle switching circuit, whenever the projection requires that $$|a_1-b_1|<|a_3-b_3|$$

This condition obtains in the projection of "bird's eye" and "worm's eye" views.

The quotients $f_1$ and $f_2$ may be indefinitely large, positive or negative numbers. These terms are fed directly to the output unit; and they may be printed by the output unit as maximum quotients, or they may be substituted by an over-flow symbol when their magnitudes are excessive.

The distance between $A_{j(i)}$ and $B_{j(i)}$ is chosen arbitrarily by the draftsman. If this distance is increased, precision in the output is increased at the expense of the physical angle of view.

In addition to the perspective projection, the orthogonal projection $G_{k(j(i))}$ may be obtained. This latter projection is used in isometric, diametric, trimetric and auxiliary orthographic drawings. Points both forward and to the rear of $A_{j(i)}$ are projected, dropping perpendiculars to the picture plane. In the computation of perspective, $G_{k(j(i))}$ is an intermediate transformation. As in perspective, the line $AB_{j(i)}$ is turned to a point and is located at the origin, (0, 0);

$$\begin{bmatrix} 0 & 0 \\ 0 & 0 \\ g_1 & g_2 \end{bmatrix}$$

where:

The rules from the perspective projections relating to the rotation of two-space coordinates, the preservation of units, the establishment of the horizon, and coordinate-trading in the three-space system, also apply to orthographic projections. However, vanishing points and excessive quotients will not occur in orthographic projections, and increasing the distance between $A_{j(i)}$ and $B_{j(i)}$ has no effect. In orthographic projections, the theoretical observer is receded along the line $AB_{j(i)}$ to infinity, and the points $C_{k(i)}$ which fall back of $A_{j(i)}$ are therefore included.

Aside from simplicity of construction using existing drafting table methods, the principal reason for using axonometric drawings in the past has been the dimensionability of such projections. Elementary rectangular solids may be dimensioned on their principal edges, using as units $$\frac{|a_1-b_1|}{\sqrt{(a_1-b_1)^2+(a_2-b_2)^2+(a_3-b_3)^2}}$$

$$\frac{|a_2-b_2|}{\sqrt{(a_1-b_1)^2+(a_2-b_2)^2+(a_3-b_3)^2}}$$

$$\frac{|a_3-b_3|}{\sqrt{(a_1-b_1)^2+(a_2-b_2)^2+(a_3-b_3)^2}}$$

In isometric the above expressions are equal.

For stereo-optical perspective, the correct projections are obtained by setting up lines of sight for the two observer's eyes $A_{j=1}$ and $A_{j=2}$. Natural stereo is the result of leaving $B_{j=1}$ equal to $B_{j=2}$. In conventional stereo-optical photography, $E_{j=1}$ is made equal to $E_{j=2}$. For stereo films, both $A_{j=1}$ and $A_{j=2}$ are moved in a trajectory relative to an *i*th swarm of points, using frame-to-frame increments along this trajectory. For simplified cartoons and fine arts experiments, a variety of methods might be tried.

The following algebraic identities will be used in the ensuing discussion:

$$E=[e_1, e_2, e_3]$$
$$=[(a_1-b_1), (a_2-b_2), (a_3-b_3)]$$
$$\Gamma=[\gamma_1, \gamma_2, \gamma_3]$$
$$=[(a_1-c_1), (a_2-c_2), (a_3-c_3)]$$
$$\omega=e_1\gamma_1+e_2\gamma_2$$
$$\lambda=\omega+e_3\gamma_3$$
$$d_1=\sqrt{e_1^2+e_2^2+e_3^2}$$
$$d_2=\sqrt{e_1^2+e_2^2}$$

$$g_1=\frac{\dfrac{(a_3-b_3)[(a_1-b_1)(a_1-c_1)+(a_2-b_2)(a_2-c_2)]}{\sqrt{(a_1-b_1)\ +(a_2-b_2)^2}}-(a_3-c_3)\sqrt{(a_1-b_1)^2+(a_2-b_2)^2}}{\sqrt{(a_1-b_1)^2+(a_2-b_2)^2+(a_3-b_3)^2}}$$

$$g_2=\frac{(a_1-b_1)(a_2-c_2)-(a_1-c_1)(a_2-b_2)}{\sqrt{(a_1-b_1)^2+(a_2-b_2)^2}}$$

Perfect isometric projection is obtained if the draftsman chooses the line $AB_{j(i)}$ such that $$|a_1-b_1|=|a_2-b_2|=|a_3-b_3|$$

$$d_4=d_1^2/d_2$$
$$\tau=e_1\gamma_2+e_2\gamma_1$$
$$\Psi=\frac{e_3\omega}{d_2}-d_2\gamma_3$$

$$F=[f_1, f_2]$$

$$=\left[\left(\frac{d_1\Psi}{\lambda}\right),\left(\frac{d_\Psi\tau}{\lambda}\right)\right]$$

$$G=[g_1, g_2]=\left[\left(\frac{\Psi}{d_1}\right),\left(\frac{\tau}{d_2}\right)\right]$$

The space transformations provide, therefore, as illustrated in FIGURES 2A–2C, that the resulting 3-space coordinate system be centered with the observer $A_j$ at its origin, and with the negative projection of its 1 axis extending from the observer and through the center $B_j$ of the picture plane 10 (FIGURE 2C). The picture plane is disposed perpendicular to the 1 axis. After the necessary transformations have been made to provide the configuration of FIGURE 2C, the members of the array, as indexed to the 3-space coordinate system of FIGURE 2C may be projected into the picture plane 10 and indexed with respect to a planar coordinate system in that plane having the center $B_j$ as its origin. This latter projection may be perspective or orthographic, as described above. Moreover, any type of these projections may be realized by the proper choice of the parameters $A_j$ and $B_j$.

In carrying out the concepts of the invention, and as will be described in more detail subsequently, a system is provided, in which signal indications of the 3-space Cartesian coordinates (FIGURE 1) of the different points in the $i$th array are input. These signal indications are input by means, for example, of a paper tape reader. The 3-space coordinates (FIGURE 1) of the observer $A_j$, and of the center picture plane $B_j$ are input to the system by manual switching means. The following are typical operational specifications:

*Part I.*—Read the $i$th paper tape, containing all the points in a particular three-dimensional array, that is, $[i, k, C_{k(i)}]$. By way of example, for $i=3$:

[3 1 —346 299 —187 2 —340 203 —186 3 —332 118 —180 . . .]

*Part II.*—Process the $i$th tape according to $j$th manual inputs, which are parameters for projection, $ij$, namely, the $j$th observer and $j$th center of interest in the $i$th array $[j, A_{j(i)}, B_{j(i)}]i$. For example, for $j=2$:

[2 —123 025 —124 367 —021 408]

In addition, all square root functions may be included as manual inputs, as there is no $k$th square root in the transformations.

*Part III.*—Print, for projection $ij$, the $j$th input parameters from manual inputs and $i$ from the tape (for external checking), together with two dimensional outputs for every point. Exemplary formats:

$$\left[\begin{array}{llll}
\text{Configuration } i & & & i, j \\
\text{Projection } j & & & a_{1j}, a_{2j}, a_{3j} \\
\text{Observer } a_1, a_2, a_3 & & & e_{1j}, e_{2j}, e_{3j} \\
\text{Picture Plane } b_1, b_2, b_3 & & & d_1, d_2 \\
 & & & \\
\text{or} & & & \\
 & & & \\
k & X_k & Y_k & k, f_{1k}, f_{2k} \\
k & X_k & Y_k & k, f_{1k}, f_{2k} \\
k & X_k & Y_r & k, f_{1k}, f_{2k} \\
\cdot & \cdot & \cdot & \cdot\ \cdot\ \cdot \\
\cdot & \cdot & \cdot & \cdot\ \cdot\ \cdot \\
\cdot & \cdot & \cdot & \cdot\ \cdot\ \cdot
\end{array}\right]$$

*Part IV.*—Scale for about 4 decimal digits in $A_{j(i)}$ and $E_{j(i)}$, and 3 decimal digits in both $B_{j(i)}$ and $C_{k(i)}$. To facilitate scaling, the artist can be requested to choose $B_{j(i)}$ according to some rule, such as the region of the most distant $C_{k(i)}$ of interest. Note that the angle of view is a function of (1) the separation of $B_{j(i)}$ from $A_{j(i)}$ and (2) the admissibility of quotients in the $F_{k(ij)}$ divisions.

In the practice of the invention, and as described above, the draftsman considers the three-dimensional object to be projected as a group of independent points in a Cartesian 3-space coordinate system, and records by known means the significant points in the array. As also mentioned, the three coordinates of any $k$th member $C_k$ of the array will be referred to as $c_{1k}$, $c_{2k}$ and $c_{3k}$, and an identification "$i$" is also applied to the array itself.

A five-hole paper tape, for example, is prepared, containing in a conventional punched code, the successive numbers $C_{k(i)}$ for the $i$th array, with the "$i$" itself being punched at the beginning of the tape. The succession of coded numbers on the tape will then be, for example, ($i$; K, $c_{1k}$, $c_{2k}$, $c_{3k}$; K, $c_{1k}$, $c_{2k}$, $c_{3k}$; K, . . .). This particular tape constitutes the "$i$th paper tape" and it represents the draftsman's physical embodiment of the three-dimensional $i$th object of his drawing. The tape may be used repeatedly, and it need not be read more than once for each two-dimensional projection of the $i$th object.

As shown in FIGURE 4, one embodiment of the system of the invention includes an input device 20 which may take the form of a usual paper tape reader, or it may take the form of any other known type of input device. The input device 20 will be referred to in the subsequent description as a paper tape reader 20, and it will be assumed to contain the $i$th tape representing a source of representations of the coordinates of different points of the $i$th object with respect to a selected three-space coordinate system. As is well known, the paper tape reader 20 is provided with suitable wire brushes, or with photo-electric means, which enables it to read the code punched into the paper tape, and to provide a series of output signals representative of the information described above.

Also illustrated in FIGURE 4 is a manual switchboard 22. This switchboard contains a plurality of manually operable switches which may individually be set to an "on" or an "off" condition. The switches of the switchboard 22 are arranged in a coded configuration, so that different binarily coded multi-digit numbers, for example, may be provided in correspondence with the different selected settings of the switches.

Both the paper tape reader 20 and the manual switchboard 22 feed their output signals into a projecting system 24. This projecting system in the embodiment of the invention to be described takes the form of a relay calculator. It is to be distinctly understood, that such a calculator is included herein merely as illustrating one particular embodiment of the invention which is suitable for accomplishing the intended purpose of the invention. It is within the purview of the present invention to incorporate any other type of projecting system which is equivalent in its function to the system to be described.

Also coupled to the projecting system 24 is an output device, such as an electrically controlled typewriter 26. For purposes of explaining and illustrating the present invention, a simple typewriter will be described subsequently. This typewriter, for example, will provide simply "1" and "0" indications for the binarily coded signals output to it by the calculator system. It will be apparent immediately to those skilled in the computer art, that other and more elaborate types of typewriters may be used. For example, the binarily coded output signals from the calculator system may be fed through a suitable matrix to cause the typewriter to provide a decoded printed record of the actual calculator outputs.

The paper tape reader 20 is, as noted above, a standard unit. Such units are manufactured, for example, by the Royal McBee Company, and are designated by them as their Model 891T9 Paper Tape Reader and Punch. The paper tape reader 20 is operated by the internal switching control system of the calculator 24. This control system causes the paper tape to advance, and at the same time causes an internal input buffer system 28 (FIGURE 5) to be loaded with data corresponding to the code punched on the paper tape. The code is read from the tape by means of appropriate transducers, such as the wire brush assembly or photo-electric means described above.

The manual switchboard 22 is the means by which the draftsman enters the parameters relating to the position of the particular plane in which the $j$th projection of the $i$th object is to be made. The switchboard may comprise, for example, 36 rotary switches. Thirty of the switches may represent decimal digits, and 6 of the switches may represent binary digits corresponding to the signs of the decimal digits.

The draftsman's parameters for the $j$th projection in the selected plane are (1) the indices "$j$"; (2) three coordinates for the observer's point $A_{j(i)}$; (3) three coordinates for the center of the picture plane $B_{j(i)}$; (4) the distance $$d=\sqrt{(a_1-b_1)^2+(a_2-b_2)^2+(a_3-b_3)^2}$$

(5) the distance $d_2=\sqrt{(a_1-b_1)^2+(a_2-b_2)^2}$; and (6) the distance $d_3\sqrt{(a_2-b_2)^2+(a_3-b_3)^2}$.

The succession of switchboard entries is: ($j$; $a_{1j}$, $a_{2j}$, $a_{3j}$; $b_{1j}$, $b_{2j}$, $b_{3j}$,; $d_{1j}$, $d_{2j}$, $d_{3j}$).

The electrically controlled typewriter output device 26 may, for example, be a four column printer in a more elaborate embodiment of the invention. Such an output device would replace the typewriter to be described and which is referred to above, and it is made and sold, for example, by the Royal McBee Company and designated by them as their typewriter number 180X9000. The electrically controlled typewriter 26 records on paper tape of the type used, for example, in adding machines. Like spacing, etc. are controlled by the internal switching circuitry of the calculator 24. A full line of four decimal characters may be written simultaneously from a single internal buffer switching register on a command from the control circuitry in the calculator. The characters recorded by the typewriter 26 represents the corresponding two-space coordinates of each member in the $i$th array, as projected into the $j$th picture plane and with respect to a planar coordinate system in that plane having its origin at the center point.

The projector 24 performs the necessary operations to convert the inputs from the paper tape reader 20 and from the manual switchboard 22 into the outputs recorded by the electrically controlled typewriter output device 26. The apparatus to be described in detail is, as mentioned above, a relay type of calculator. This calculator includes a plurality of electrically operated relays in the embodiment of the invention to be described in detail, and these relays are inter-connected to perform certain functions, as will be described.

It should again be reiterated that the present invention is not limited to a relay type of calculator of the type to be described in detail, and that any of the components, systems and sub-systems included in the apparatus to be described will suggest known equivalents to those skilled in the art. These equivalents may be substituted in the apparatus in place of the described systems, sub-systems, assemblies and sub-assemblies. For example, an analog type of calculating system may be substituted for the relay system to be described.

The relay system to be described includes a plurality of relays which are inter-connected to one another and to the paper tape reader 20 and to the electrically controlled typewriter 26. These relays may be grouped into certain functional blocks, and these blocks will be described in detail subsequently. A typical system for carrying out the invention is shown in block form in FIGURE 5.

Figure 5:
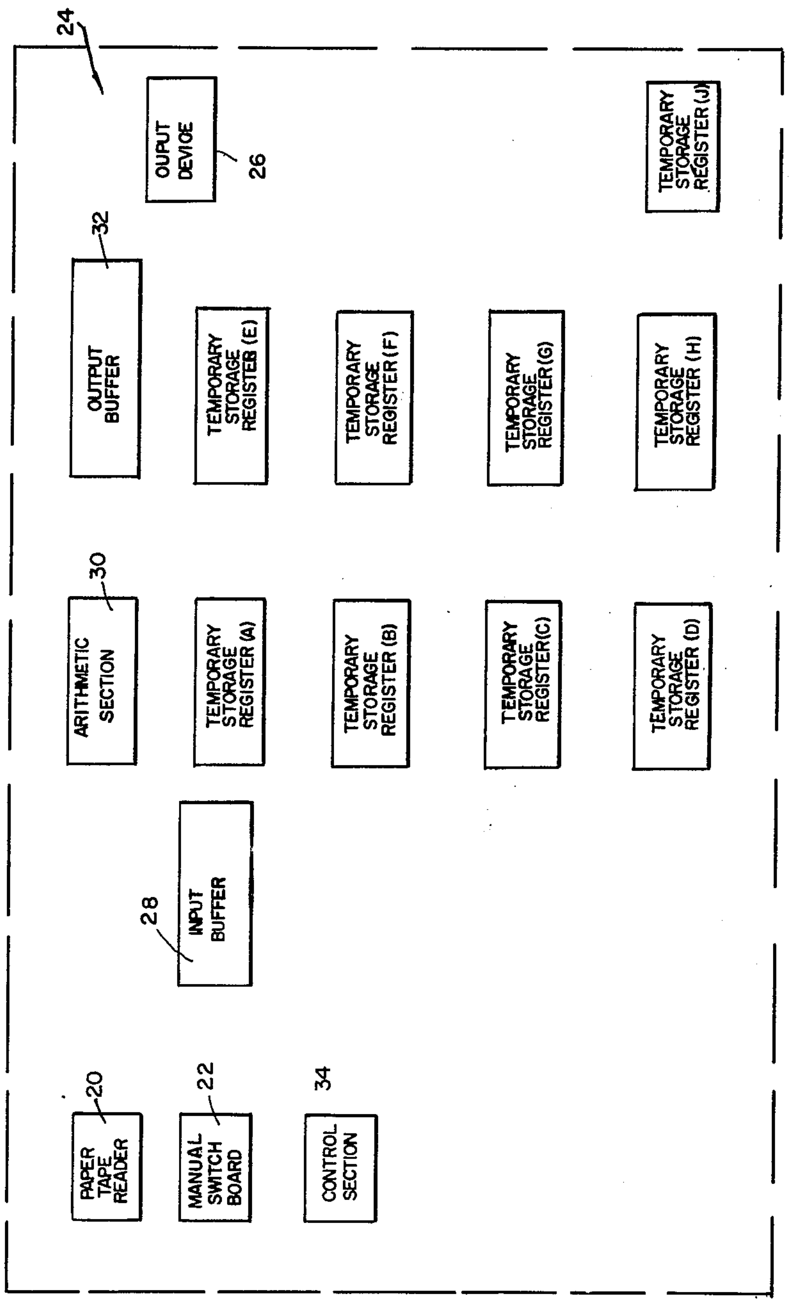
FIGURE 5 is a block diagram of a generalized system suitable for carrying out the invention.

The system of FIGURE 5 includes an input buffer 28 which receives the input information from the paper tape reader 20. The system of FIGURE 5 also includes a plurality of temporary storage registers, these being designated A, B, C, D, E, F, G, H and J. The system of FIGURE 5 also includes an arithmetic section 30 which performs the necessary arithmetic operations. The system also includes an output buffer 32 which receives the computed output numbers, and which stores the output numbers and uses them to control the typewriter output device 26. Finally, the system of FIGURE 5 includes a control section 34 which programs the system and controls the operation of the various components in the system.

It is required that the arithmetic section 30 add, multiply and divide. In the particular embodiment to be described, the quantities involved are three-decimal digit quantities, for example. The control section 34 controls and operates the other components of the system of FIGURE 5 in an appropriate manner such that the following program steps may be executed:

*Part I.*—Line space the output typewriter 26 four spaces. Advance the input paper tape reader 20, read the index "$i$" on the tape and print "$i$" on the tape in the output typewriter 26. Successively transfer the contents of the manual switchboard 22 to the tape in the output typewriter 26 and print each $j$th input, that is, $j$; $a_1$, $a_2$, $a_3$; $b_1$, $b_2$, $b_3$; $b_1$, $b_2$, $b_3$. Line space the output typewriter 26 two additional spaces. Calculate and store the quantities $(a_1-b_1)$, $(a_2-b_2)$ and $(a_3-b_3)$ into the memory registers A, B and C respectively. Compare the contents of the register A with the contents of the register C to determine which has the greater absolute value. If the absolute value of C is equal to or greater than the absolute value of A, branch the program control to Part III, otherwise execute Part II.

*Part II.*—Operate switches to cause the inputs $a_1$, $a_2$, $a_3$, $d_3$ from the manual switchboard 22 to be treated as $a_3$, $a_1$, $a_2$, $d_2$ respectively; where the quantity $d_3$ is substituted by the quantity $d_2$. Transfer the contents of the memory register C to the memory register B, transfer the contents of the memory register B to the memory register A and transfer the contents of the memory register A to the memory register C. Adjust the program in Part V to cause the paper tape inputs $c_1$, $c_2$, $c_3$ to be treated rather as operands $c_3$, $c_1$, $c_2$ respectively.

*Part III.*—Calculate and store the quantity $$\frac{d_1^2}{d_2}$$

into the memory register D. Transfer control to Part IV.

*Part IV.*—Line space the paper in the output typewriter 26 one space, and transfer control to Part V.

*Part V.*—Read the index K from the input tape reader 20. Transfer the print "K" on the tape to the output typewriter 26 by using the input buffer 28 and the output buffer 32. Read the quantity $c_1$, and calculate and store $(a_1-c_1)$ in the memory register E. Read the quantity $c_2$, and calculate and store $(a_3-c_1)$ in the memory register E. Read the quantity $c_3$ and calculate and store $(a_3-c_3)$ in the register G. Now, calculate and store the quantity $(GB+EA)$ into the memory register H.

Where:

GB is the contents of the G register multiplied by the contents to the B register; EA is the contents of the E register multiplied by the contents of the A register.

Calculate and store the quantity $$\frac{HC}{d_2}-d_2C$$

in the memory register J.

Where:

HC is the contents of the H register multiplied by the contents of the C register.

Calculate and store the quantity $J/d_1$ into the output buffer 32 and print that quantity on the tape in the output typewriter 26, the quantity being the X coordinate of the axanometric projection. Calculate and store the quantity $(AF-BE)$ into the memory register E.

Where:

AF is the contents of the A register multiplied by the contents of the F register; BE is the contents of the B register multiplied by the contents of the E register.

Calculate and store the quantity $E/d_2$ into the output buffer 32 and print that quantity on the tape in the output typewriter 26, the latter quantity being the Y coordinate of the axonometric projection. Calculate the quantity $(CG+H)$.

Where:

CG is the contents of the C register multiplied by the contents of the G register; H is the contents of the H register.

If this quantity is equal to or less than O, transfer control to Part IV, as this point is out of the perspective view; otherwise compute the perspective output by transferring control to Part VI.

*Part VI.*—Store the quantity last calculated into the memory register F. Calculate and store the quantity $d_1J/F$ into the output buffer 32 and print this quantity on the tape in the output typewriter 26, the latter quantity being the X coordinate of the perspective projection. (In cases where the quotient is excessive, cause the typewriter 26 to print a code indicating that fact.) Now calculate and store the quantity $(DE/F)$ into the output buffer 32 and print this quantity on the tape in the output typewriter 26, the latter quantity being the Y coordinate of the perspective projection. (Again, if the quotient is excessive, cause the typewriter 26 to print a code designation indicating that fact.) Return control to Part IV.

The concepts described above may be carried out in a relay type of calculator system which will be described in some detail in FIGURES 6–23. The pictorial projector calculator, such as the particular system to be described, is different from a general purpose type of computator system in several important aspects, as will be mentioned briefly in the following paragraphs.

The manual switchboard 22 is constructed for specific input parameters. The tape reader 20 is extremely slow in its operation, and it has no provision for feed or take-up because the draftsman operating the machine will us and re-use short tapes only to achieve the objectives of the system.

The tape input buffer, which will be referred to as the "Γ buffer" is wired to perform certain subtractions, as will be explained, to yield $\Gamma_{k(j(1))}$ rather than $C_{k(1)}$ to the buses of the calculator.

Input cycle register circuitry is used which causes the coordinate axes to be traded for all the manual and tape input terms, this being unique in the system used in practicing the invention.

The calculator system to be described does not provide a general purpose output. The output capabilities of the system are limited to copied inputs and quotients typed serially during division.

The arithmetic capabilities of the system to be described are limited to fit the function of the system. To this end, only a small number of digits are carried in the arithmetic section. Moreover, for the specific needs of the present system, multipliers are smaller than multiplicands, allowing a reduction in the number of iterative additions and shifts normally expected.

"Branch-on-zero" logic (for λ) is eliminated in the system to be described by allowing division by zero to yield division overflow. By the same token, "Branch-on-Division" logic is eliminated by allowing the divider to write any excessive quotient as the maximum possible quotient, bearing the correct sign. Likewise, "Branch-on-Minus" logic for out-of-view perspective points $C_{k(1)}$ is eliminated by causing the typewriter to null cycle for any negative divisor.

Further circuitry reductions are effectuated in the system to be described. For example, circuitry for determining the sign of the quotient is eliminated by copying the sign of the dividend in the typewriter output. Comparator circuitry for "bird's eye" and "worm's eye" views is eliminated by setting the manual indicator switch "on" for $|e_1|<|e_3|$.

Likewise, for further logic circuit reductions, entry-and-exit programming logic and unconditional branching logic are eliminated by keeping all the operations in one loop. Programmed recording of parameters is eliminated by having the artist type *j*th notes, etc., by hand, while setting up each projection. Trigonometric functions and square root calculations are eliminated by using two square roots, calculated by the operator, as manual switchboard inputs.

The memory of the system to be described contains only three memory cells, and they are scaled to minimum length. There is no provision in the system to permit general purpose calculations. Speed is unimportant as a consideration, so that solid state circuits can be made more simple than in the general type of electronic digital computer systems.

The factors and considerations enumerated in the preceding paragraphs permit the system of the invention to be embodied in light, compact, economical and easy to operate equipment.

The details of a relay type of calculator 100 are shown in FIGURES 6–23. The construction of the particular computer to be described is such that it can easily be reduced to a transistorized office machine, of a size approaching a usual typewriter. The computer to be described accepts as input a punched paper tape on which is recorded the X, Y and Z 3-space coordinates of arbitrarily chosen points in a particular array corresponding to a particular item to be projected. The computer also accepts keyboard inputs which are entered manually, and these are the X, Y and Z 3-space coordinates of an observer or station point and of a picture center in the selected projection plane towards which the observer is looking.

Figure 6:
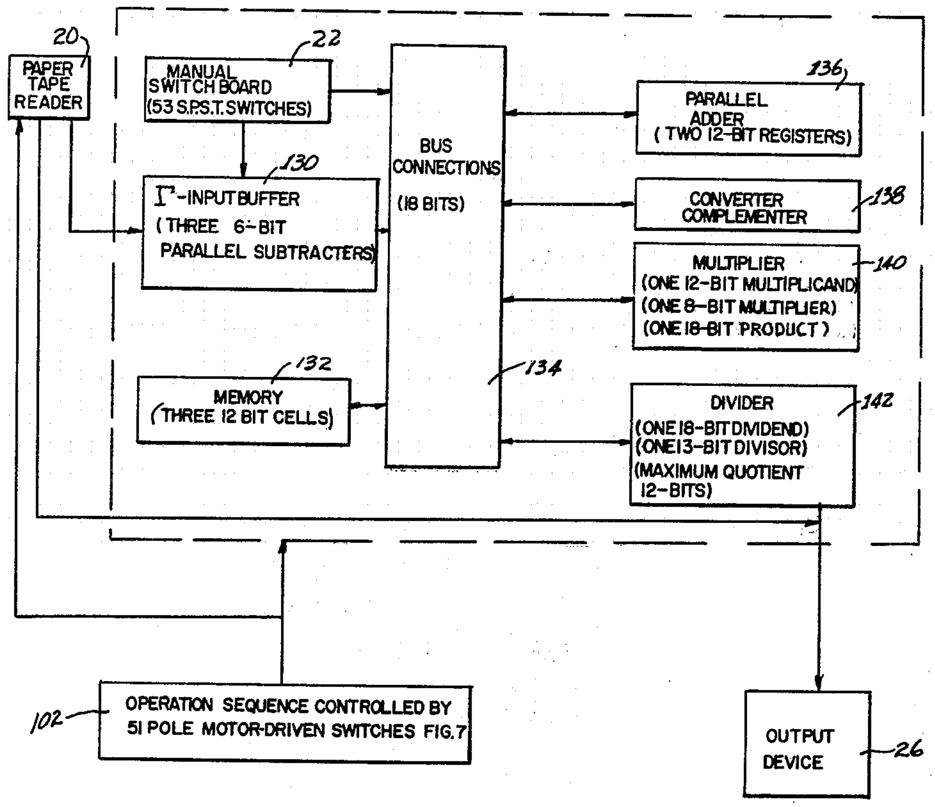
FIGURE 6 is a block diagram of a relay type of calculator which is capable of carrying out the concepts of the invention and which is illustrative of one manner in which the system of the invention may be embodied.

The block diagram of FIGURE 6 includes the paper tape reader 20, and the output device 26 referred to in conjunction with FIGURE 5. The calculator 100 also includes the manual switchboard 22 which may incorporate, for example, 53 single-pole single-throw switches.

Figure 7:
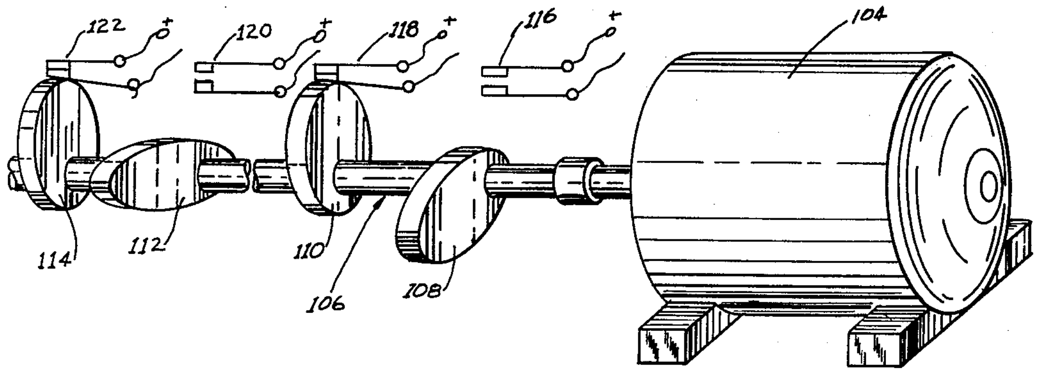
FIGURE 7 is a perspective, fragmentary showing of a motor-cam assembly which is used to control switches in the calculator system of FIGURE 6.

The operation sequence of the calculator 100 is controlled by a 51 pole motor-driven switch, designated by a block 102 in FIGURE 6. This switching assembly, as shown in FIGURE 7, includes a drive motor 104 which is coupled to a cam shaft 106. A plurality of cams, such as the cams 108, 110, 112 and 114 are mounted on the shaft 106. The cam 108 is associated with a pair of switch contacts 116, the cam 110 is associated with a pair of switch contacts 118, the cam 112 is associated with a pair of switch contacts 120, and the cam 114 is associated with a pair of switch contacts 122. One of the contacts of each of the pairs may be connected to the positive terminal of a source of unidirectional control voltage.

When the motor 104 is energized, it causes the cam shaft 106 to rotate. This causes the cams 108, 110, 112 and 114 selectively to close their associated switch contacts. It will be appreciated that a plurality of similar cams are mounted on the cam shaft 106, and that these cams are respectively associated with a corresponding plurality of switch contacts. The cams are positioned on the shaft so as to open and close their associated contacts in accordance with a timing, illustrated, for example, in the timing diagrams of FIGURES 8A and 8B.

The calculator 100 also includes a group of input buffers which are represented in FIGURE 6 by the Γ input buffer block 130. As indicated in that block, these buffers may include three 6-bit parallel subtracters. The calculator 100 also includes a memory which is represented by a block 132. This memory may incorporate three 12-bit cells, as shown.

The blocks 22, 130 and 132 in FIGURE 6 are all connected to a block 134. The latter block forms a control function and serves to connect the outputs from the blocks 22, 130 and 132 to the other components of the calculator.

The calculator 100 includes in its arithmetic section a parallel adder represented by a block 136, and this adder may in turn include two 12-bit registers. A converter complementer 138 is also included in the calculator. The arithmetic section of the calculator further includes a multiplier represented by a block 140. The multiplier may include one 12-bit multiplicand register, one 8-bit multiplicand register and one 12-bit product register. A divider represented by a block 142 is also included in the arithmetic section of the calculator 100. This divider 142 has an 18-bit dividend register, a 13-bit divisor register, and a 12-bit maximum quotient register. The divider 142 is coupled to the output device 26, as is the paper tape reader 20.

The input buffer 130, as noted above, will be referred to as the Γ buffer. This buffer includes three registers into which $C_{k(i)}$ is read but which yield $\Gamma_{k(j(i))}$ to the bus connector block 134 due to appropriate wiring with the manual $A_{j(i)}$ switches. The programming in the computer is under the control of the motor driven switches of FIGURE 7. The quotient in the divider 142 is produced serially, and it may be directed either to the bus connections 134 or to the output device 26, as shown in FIGURE 6.

The tape inputs from the paper tape reader 20 are received in the following order: [K, $c_{1k}$, $c_{2k}$, $c_{3k}$; K, $c_{1k}$, $c_{2k}$, $c_{3k}$; K, $c_{1k}$, $c_{2k}$, $c_{3k}$; . . .]. The tape in the paper tape reader 20 is set so that the reading brushes engage the K punches when the mechanism is first started.

The manual inputs, as set by the manual switchboard 22 are: $a_1$, $a_2$, $a_3$ (5 bits each); $e_1$, $e_2$, $e_3$ (6 bits each); $d_1=\sqrt{e_1^2+e_2^2+e_3^2}$ (6 bits without sign); $d_2=\sqrt{e_1^2+e_2^2}$ or $\sqrt{e_2^2+e_3^2}$ (whichever is greater) (6 bits without sign); and $d_4=d_1^2/d_2$ (7 bits without sign); the manual indicator is on if $(|e_3|>|e_1|)$.

The indices K may be in any selected code, whether alphabetic or numeric. All the $A_j$ and $C_k$ terms are in ones-complement binary form, whereas all the $e_j$ and $d_j$ terms are in signed absolute form. The machine operator has the option to type heading indices and parameters in any desired formation. The typewriter outputs are $Kc_1c_2c_3g_1g_2f_1f_2$; $Kc_1c_2c_3g_1g_2f_1f_2$; $Kc_1c_2c_3$ . . .

The terms are correctly scaled for "5-bit space." That is, geometric scalar coordinates may range from −15 to +15. The scaling in a particular embodiment of the invention was made as follows:

$a$ (max.)=±15
$e$ (max.)=±30
$d$ (max.)=±52
$d_2$ (max.)=±42
$d_4$ (max.)=±64
$c$ (max.)=±15
$\gamma$ (max.)=±30
$\omega$ (max.)=±1800
$\psi$ (max.)=±1286
$\tau$ (max.)=±900
G (max.)=±25
$\lambda$ (max.)=±2250
$(d_1\psi)$ (max.)=±66872
Maximum multiplier=±64
Maximum multiplicand=±1800
Maximum product=±66872
Maximum dividend=±66872
Maximum divisor=±2250
Maximum quotient=±1286

A commercial machine should preferably be scaled for $a$ (max.)=$b$ (max.)=$c$ (max.)=±999.

Figure 8A:
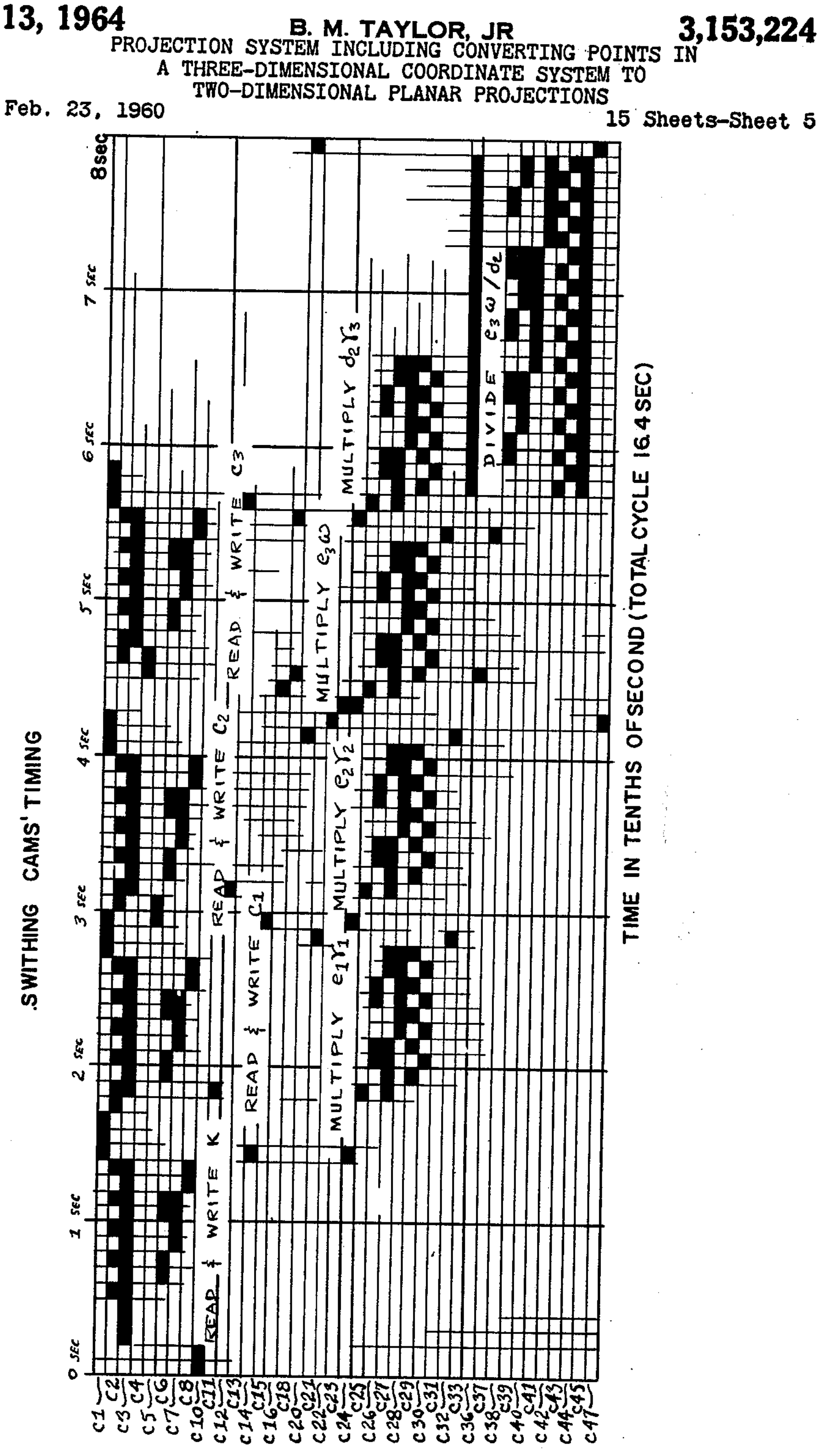
FIGURES 8A and 8B are timing diagrams of the cam operated switches driven by the assembly of FIGURE 7.
Figure 8B:
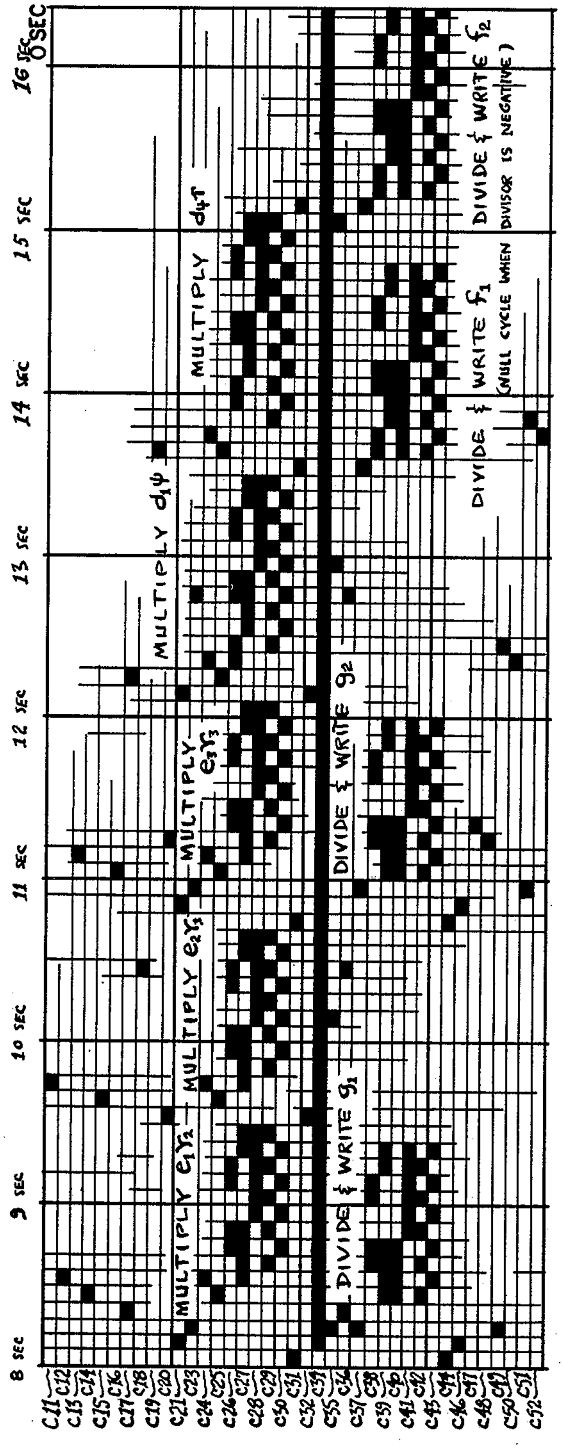

The cam operated switches of FIGURE 7 are grouped and operated in the manner designated in FIGURES 8A and 8B, as mentioned above. As indicated in those figures, the cam operated switches may be designated as follows:

*Input-Output Units*

C1—Step paper tape advance ratchet
C2—Drive pulse to paper tape reading station
C3—Switch C2 pulse to output device
C4—Switch C2 pulse to $\gamma_3$ buffer
C5—Switch C2 pulse to $\gamma_2$ buffer
C6, C7, C8—Direct tape bits to output device
C9—Spare
C10—Line space and carriage return for output device
C11—Connect $\gamma_1$ buffer to buses
C12—Connect $\gamma_2$ buffer to buses
C13—Connect $\gamma_3$ buffer to buses
C14—Connect $e_1$ switches to buses
C15—Connect $e_2$ switches to buses
C16—Connect $e_3$ switches to buses
C17—Connect $d_1$ switches to buses
C18—Connect $d_2$ switches to buses
C19—Connect $d_4$ switches to buses

*Parallel Adder Arithmetic Unit 136*

C20—Connect buses to augend register in adder
C21—Connect buses to addend register in adder
C22—Connect ones-complement sum to buses
C23—Connect signed-absolute sum to buses

*Multiplier Arithmetic Unit 140*

C24—Connect buses to signed-absolute multiplicand register
C25—Connect buses to signed-absolute multiplier register; clear multiplying adder
C26, C27, C28—Shift multiplicand to right
C29—Add multiplicand to partial product if multiplier indicates
C30—Drive partial product to multiplying adder
C31—Connect signed-absolute product to buses
C32—Connect ones-complement product to buses

*Divider Arithmetic Unit 142*

C33—Set to drive signed-absolute binary quotient serially to buses; drive maximum quotient in division overflow
C34—Set to drive signed-absolute quotient serially to output device, writing the sign when dividend is entered but writing magnitude bits during division (compatible with C33)
C35—Introduce pulse to the space bar of the output device
C36—Connect the buses to the signed-absolute divisor
C37—Connect the buses to the signed-absolute dividend
C38, C39, C40, C41—Shift divisor to the right
C42—Introduce remaining dividend to adders
C43—Introduce quotient bit and new remaining dividend to remainder register

*Converter-Complementer 138*

C44—Connect buses to the conversion register in the complementer
C45—Connect the conversion register to the buses (ones-complement converted to signed-absolute, and vice versa)
C46—Connect the conversion register to the buses (signed-absolute converted to ones-complement with sign changed)

*Memory 132*

C47—Connect buses to the cell 1 of the memory
C48—Connect cell 1 of the memory to the buses
C49—Connect the buses to the cell 2 of the memory
C50—Connect the cell 2 of the memory to buses
C51—Connect the buses to the cell 3 of the memory
C52—Connect the cell 3 of the memory to the buses.

The cams on the cam shaft 106 in FIGURE 7 are arranged so that the switches operated by the cams are opened and closed in accordance with a timing sequence such as illustrated, for example, in FIGURES 8A and 8B. This timed cam switching action causes the calculator system to execute the following program steps.

(1) Read and write $k$;
(2) Read and write $c_1$ while multiplying $e_1\gamma_1$;
(3) Read and write $c_2$ while multiplying $e_2\gamma_2$;
(4) Read and write $c_3$ while multiplying $e_3\omega$;
(5) Divide $e_3\omega/d_2$ while multiplying $d_2\gamma_3$;
(6) Divide and write $g_1$ while multiplying $e_1\gamma_2$ and $e_2\gamma_1$;
(7) Divide and write $g_2$ while multiplying $e_3\gamma_3$ and $d_1\phi$;
(8) Divide and write $f_1$ while multiplying $d_4\tau$ unless divisor is negative;
(9) Read and write $f_2$ unless divisor is negative;
(10) Return to step 1.

Figures 9, 10A:
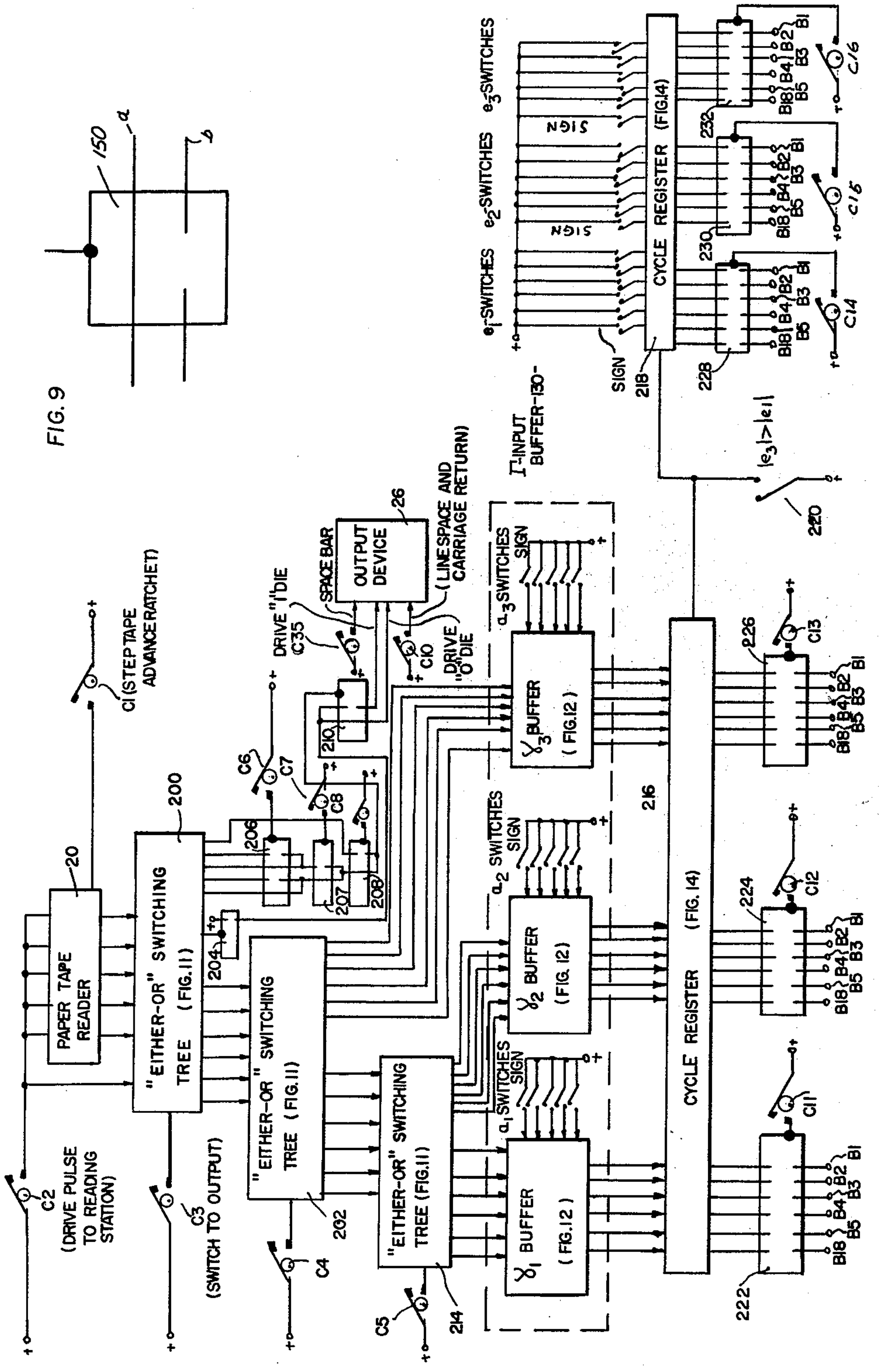
FIGURE 9 illustrates a symbol which will be used to represent relays in subsequent drawings.
FIGURES 10A, 10B and 10C are more detailed schematic diagrams of the calculator system of FIGURE 6.

In the following descripton, and for convenience in representing the various components and connections of the particular computer to be described, a relay will be represented by a particular symbol, as shown by the representation of FIGURE 9. As shown in FIGURE 9, the black dot on the rectangle indicates the positive terminal for the relay coil. The negative end of the coil may be assumed to be grounded. Any normally-closed contact in the relay is indicated by a continuous line, such as the horizontal line "$a$" in FIGURE 9 extending through the rectangle 150. This normally-closed contact opens when current is applied to the energizing coil. Any normally-open contact in the relay is indicated by a broken line, such as the horizontal broken line "$b$" extending through the relay. The normally-open contact closes when current is applied to the relay coil.

Figure 10B:
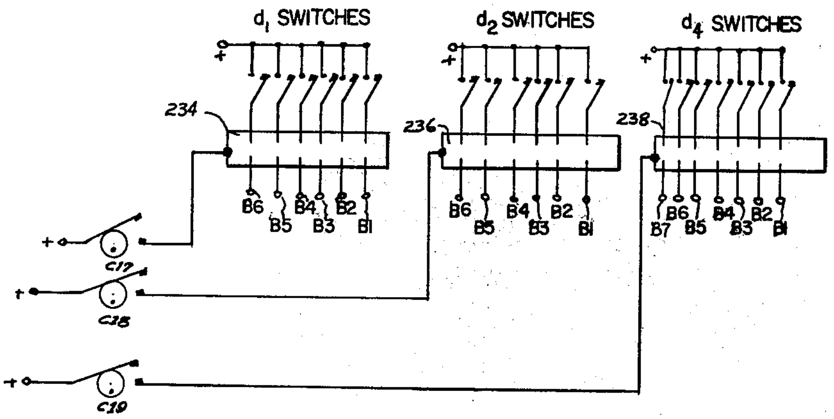
Figure 10C:
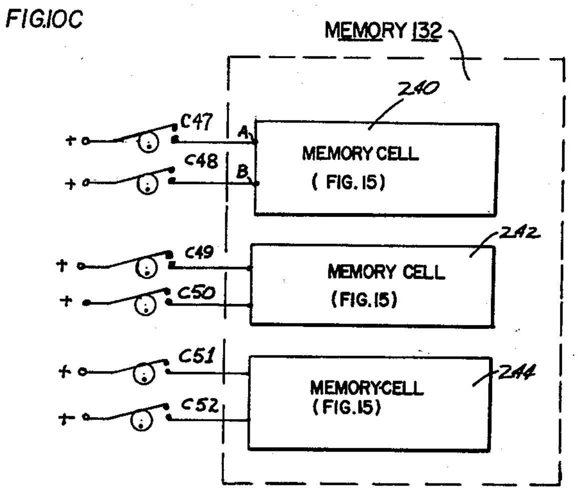

A portion of the system of FIGURE 6 is shown in more detail in FIGURES 10A, 10B and 10C. As shown in FIGURE 10A, the cam operated switch C1 and the cam operated switch C2 control the operation of the paper tape reader 20. The contents of the paper tape reader are introduced to an "either-or" switching tree 200, the details of which will be described in FIGURE 12. This switching tree is controlled by the cam operated switch C3. These tape inputs are in the form of ones-complement binary. The inputs from the switches $a_1$, $a_2$ and $a_3$ are also in the form of ones-complement binary. The inputs from the switches $e_1$, $e_2$ and $e_3$ are in the form of signed absolute binary, as are the quotient outputs to be described.

A first group of output terminals from the switching tree 200 are connected to a second either-or switching tree 202. A second group of output terminals are connected respectively to the energizing coil of a relay 204, to the contacts of a relay 206 and to a pair of normally open contacts of a relay 208. The relays 206 and 208 are connected to a relay 210 in the illustrated manner. These relays are controlled respectively by the cam operated switches C6, C7 and C8.

The contacts of the relay 208 are connected to the energizing coil of a relay 210, and the normally open contacts of the relay 204 are connected to the contacts of the relay 210. The normally open contacts of the relay 210 control the "1" die of the output device 26, and the normally closed contacts of that relay control the "0" die of the output device. The space bar of the output device 26 is controlled by the cam operated switch C35, and the line space and carriage return of the output device is controlled by the cam operated switch C10.

The either-or switching tree 202 is controlled by the cam operated switch C4. One group of output terminals of that switching tree are connected to an either-or switching tree 214, and a second group of output terminals are connected to the $\gamma_3$ input buffer. The switching tree 214 is controlled by the cam operated switch C5. One group of output terminals of the latter switching tree are connected to the $\gamma_1$ buffer, and a second group of output terminals from that switching tree are connected to the $\gamma_2$ buffer. The manual switchboard switches $a$1 are connected to the $\gamma_1$ buffer, the manual switchboard switches $a$2 are connected to the $\gamma_2$ buffer, and the manual switches $a$3 are connected to the $\gamma_3$ buffer. The buffers $\gamma_1$, $\gamma_2$ and $\gamma_3$ make up the $\Gamma$ input buffer 130. The output terminals from the buffers $\gamma_1$, $\gamma_2$ and $\gamma_3$ are connected to a cycle register 216. The buffers $\gamma_1$, $\gamma_2$ and $\gamma_3$ will be described in more detail in FIGURE 12, and the cycle register 216 will be described in more detail in FIGURE 14. The cycle register 216, and a second cycle register 218 are controlled by a manually operated switch 220. The switch 220 is closed when $|e_3|$ is greater than $|e_1|$.

The cycle register 216 has three groups of output terminals, corresponding to the output terminals of the different buffers in the input buffer 130. A first group of output terminals of the cycle register 216 are connected to the contacts of a relay 222, a second group of output terminals are connected to a relay 224, and a third group of output terminals are connected to a relay 226. The relay 222 is controlled by the cam operated switch C11, the relay 224 is controlled by the cam operated switch C12, and the relay 226 is operated by the cam operated switch C13. The contacts of these relays are connected to the different buses B1–B5, B18 of the calculator system.

The $e_1$ manual switchboard switches are connected to the cycle register 218, as are the $e_2$ switches and the $e_3$ switches of the switchboard. The register 218 has groups of output terminals respectively connected to relays 228, 230 and 232. These relays are also connected to the buses of the calculator system, and they are selectively energized under the control of the cam operated switches C14, C15 and C16.

The $d_1$, $d_2$ and $d_4$ manually operated switches of the manual switchboard 22 of FIGURE 6 are shown in FIGURE 10B. These switches are connected to respective ones of a group of relays 234, 236 and 238. The relays are selectively controlled by the cam operated switches C17, C18 and C19. The contacts of the relays are connected to the buses of the calculator system.

As shown in FIGURE 10C, the different memory cells 240, 242 and 244 of the memory 132 in FIGURE 6 are selectively controlled by the cam operated switches C47–C52.

As shown in FIGURE 10A the paper tape reader 20 is controlled by the cam operated switch C1 which controls its advance ratchet by the cam operated switch C2 which introduces drive pulses to its reading station. The resulting information from the paper tape reader is introduced to the either-or switching tree 200. This switching tree is controlled by the cam operated switch C3, as noted, and this switch causes the switching tree to introduce information from the paper tape reader to the output device 26 in a first operating mode, and to the either-or switching tree 202 in a second operating mode.

When the either-or switching tree 200 is in its first operating mode, the information from it is introduced to the output device 26 through the relays 206, 207, 208 and 210. The relays 206, 207 and 208 are respectively controlled by the cam operated switches C6, C7 and C8, as mentioned above. The relay 210 controls the "1" and "0" drive of the output device 26. The output device types a "1" when the relay 210 is energized, and it types a "0" when that relay is de-energized. The cam operated switch C5 controls the space bar for the output device 26, and the cam operated switch C10 controls the carriage return and line space of the output device, as mentioned.

When the either-or switching tree 200 is in its second mode of operation, the information from the paper tape reader 20 is fed into the either-or switching tree 202. When this latter switching tree is in a first mode of operation, it introduces the information to the either-or switching tree 204, and when it is in its second mode of operation, it introduces the information to the $\gamma_1$ buffer. The switching tree 202 is controlled by the cam operated switch C4.

The either-or switching tree 214, under the control of the cam operated switch C5, feeds the information from the switching tree 202 into the $\gamma_2$ buffer during its first operating mode and into the $\gamma_3$ buffer during its second operating mode.

Therefore, the information from the paper tape reader 20 is selectively directed under the control of the cam operated switches referred to above into the output device 26, into the $\gamma_1$ input buffer, into the $\gamma_2$ input buffer, and into the $\gamma_3$ input buffer. These three buffers, as noted above, constitute the $\Gamma$ input buffer 130 of FIGURE 6. As also noted, this buffer is wired to the manual switchboard switches *a1*, *a2* and *a3*, and performs certain subtraction functions. As shown in FIGURE 10A, the manual switches *a1* are wired to the buffer $\gamma_1$, the manual switches *a2* are wired to the buffer $\gamma_2$, and the manual switches *a3* are wired to the buffer $\gamma_3$.

The buffer $\gamma_1$ introduces the term $(a_1-c_1)$ to the cycle register 216, the buffer $\gamma_2$ introduces the term $(a_2-c_2)$ to the cycle register 216, and the buffer $\gamma_3$ introduces the term $(a_3-c_3)$ to that cycle register. These terms are selectively applied to the buses B1–B5, B18 under the control of the cam operated switches C11, C12, C13 and corresponding relays 222, 224 and 226, as described above.

The cycle registers 216 and 218 are operated when the manual switch 220 is closed. This switch is closed, as mentioned above, when the absolute value of $e_3$ is greater than the absolute value of $e_1$. When this switch is closed, the register 216 enters the terms $(a_1-c_1)$, $(a_2-c_2)$ and $(a_3-c_3)$ to the buses as $(a_3-c_3)$, $(a_1-c_1)$ and $(a_2-c_2)$. Likewise, the terms $e_1$, $e_2$ and $e_3$ established by the settings of the corresponding switches of the manual switchboard are introduced to the cycle register 218, and through that register to the buses under the selective control of the cam operated switches C14, C15 and C16, and corresponding relays 228, 230 and 232. When the manual switch 220 is closed, the register 218 causes the terms $e_1$, $e_2$ and $e_3$ to be introduced to the buses as $e_3$, $e_1$ and $e_2$.

As shown in FIGURE 10B, the $d_1$, $d_2$ and $d_4$ manual switchboard switches introduce their terms to the buses under the selective control of the cam operated switches C17, C18 and C19 and associated relays 234, 236 and 238. As shown in FIGURE 10C, and as mentioned above, information is fed into the memory cells 240, 242 and 244 of the memory 132 from the buses, this being under the control of the cam operated switches C47, C49 and C51. Conversely, information is fed from the memory cells to the buses under the control of the cam operated switches C48, C50 and C52.

Figure 11:
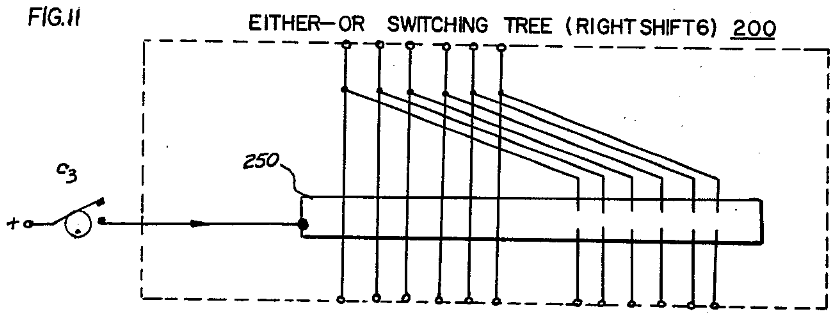
FIGURE 11 represents an "either-or" switching tree used in the calculator system of FIGURE 10A.

The composition of the either-or switching tree 200 of FIGURE 10A is shown in FIGURE 11. It will be understood that the switching trees 202 and 214 may be similarly constituted. The switching tree 200, as shown in FIGURE 11, includes a relay 250. This relay has a first group of normally closed contacts which are connected to the input terminals, and it includes a group of normally open contacts which are also connected to the input terminals. The normally closed contacts of the relay 250 are connected to the first group of output terminals referred to above, and the normally open contacts are connected to the second group of output terminals.

The energizing of the relay 250 is controlled by the cam operated switch C3, as mentioned above. When this switch is closed, the relay is energized, and the input terminals are connected to the second group of output terminals. Conversely, when the switch C3 is open, the relay 250 is de-energized, and the input terminals are connected to the first group of output terminals.

The $\gamma_1$ input buffer of the buffer 130 in FIGURE 10A is shown in greater detail in FIGURE 12. It will be understood that the input buffers $\gamma_2$ and $\gamma_3$ may be similarly constituted.

The input buffer $\gamma_1$ has a first input terminal connected to the cam operated switch C2 in FIGURE 10A and to a pulse erase unit 252 which will be described in greater detail in FIGURE 16. This erase unit is connected to each of a plurality of subtracters 254, 256, 258, 260, 262 and 264 which are connected in the input buffer. The subtracter units will be described in greater detail in conjunction with FIGURE 13. The sign input terminal of the buffer from the paper tape reader 20 is connected to the subtracters 254 and 256, and the remaining input terminals from the paper tape reader are respectively connected to the subtracters 258, 260, 262 and 264.

The input terminals from the $a_1$ switches are connected to respective ones of the subtracters 256, 258, 260, 262 and 264. The lead connected to the subtracter 256 is also connected to the subtracter 254. The subtracters 256, 258, 260, 262 and 264 are respectively connected to the energizing coil of a plurality of relays 266, 268, 270, 272 and 274. The subtracter 254 is connected to the energizing coil of a relay 276. The relays 266, 268, 270, 272 and 274 each have a pair of normally closed and normally open contacts connected to the positive terminal of a direct voltage exciting source and connected to corresponding pairs in the relay 276. The pairs in the latter relay are connected to respective ones of the output terminals of the buffer. The sign output terminal of the buffer is connected through a pair of normally open contacts in the relay 276 to the positive terminal.

As information is fed into the input buffer $\gamma_1$ of FIGURE 12 from the paper tape reader, it is subtracted from the $a_1$ term established by the corresponding manual switchboard switches. The result of this subtraction appears at the output terminals of the input buffer.

The subtracter 254 is shown in greater detail in FIGURE 13. It will be understood that the subtracters 256, 258, 260, 262 and 264 may have a similar composition. The terminal A of the subtracter 254 is connected to the energizing coil of a relay 278. The input terminal B of the subtracter is connected through a pair of normally open contacts to the terminal A. The terminal C of the subtracter 254 is connected to the relay contacts of the relay 278 and of a second relay 280 in the illustrated manner. The terminal D of the subtracter is likewise connected to the relay contacts in the illustrated manner. The terminal E is connected to the energizing coil of the relay 280. Likewise, the terminals G, H, J and K are connected to the relay contacts in the illustrated manner.

The pulse erase unit 252, as shown in FIGURE 16, includes a group of relays 282, 284 and 286. The input terminal A of that unit is connected to the energizing coil of the relay 282 and to the energizing coil of the relay 286. The output terminal B is connected through a normally closed pair of contacts in the relay 286 to the positive terminal. The energizing coil of the relay 284 is connected through a pair of normally open contacts in the relay 282 to the positive terminal. The relay 284 has a pair of normally closed contacts in the path between the input terminal A and the energizing coil of the relay 286.

Figure 14:
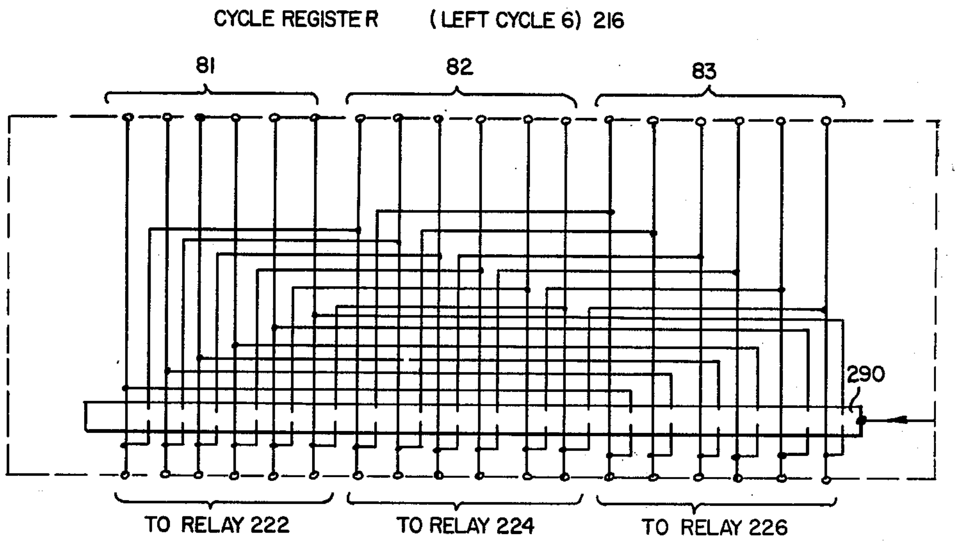
FIGURE 14 is a cycle register used in the calculator system of FIGURE 10A.

The cycle register 216 is shown in further detail in FIGURE 14. It will be understood that the cycle register 218 may have the same composition. The input terminals of the cycle register are connected to the normally closed contacts of a relay 290 in the manner illustrated. These normally closed contacts are inter-connected in the illustrated manner with groups of normally open contacts of the relay 280. The result of this connection is to cause the reversal described above of the terms when the relay 290 is energized under the control of the switch 220.

Figure 15:
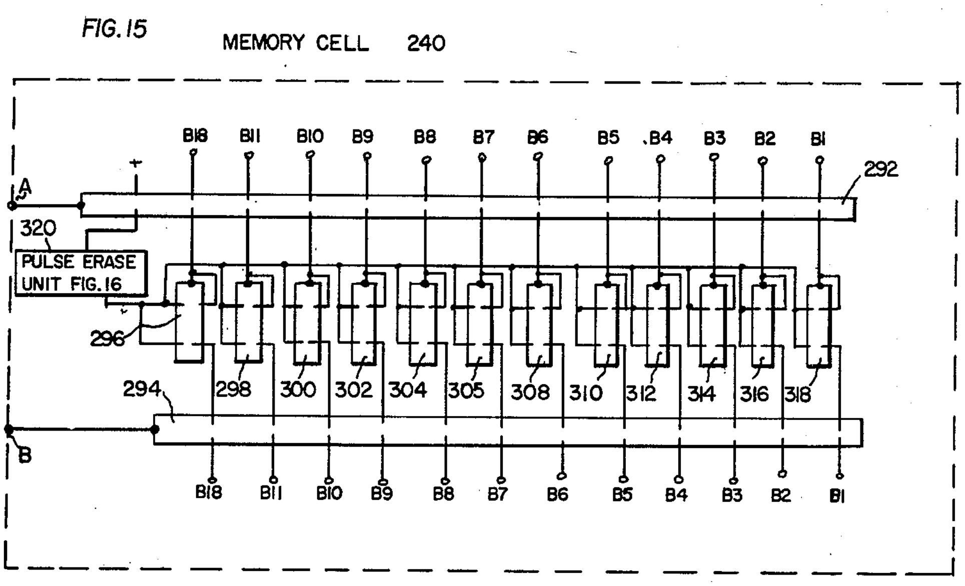
FIGURE 15 is a memory cell used in the portion of the calculator system shown in FIGURE 10C.

The memory cell 240 of the memory 132 in FIGURE 10C is shown in greater detail in FIGURE 15. The input terminal A from the cam operated switch C47 is connected to the energizing coil of a relay 292 in the memory cell, and the input terminal B from the cam operated switch C48 is connected to the energizing coil of a relay 294. When the relay 292 is energized, the buses B1–B11, B18 of the system are respectively connected to the energizing coils of a group of relays 296, 298, 300, 302, 304, 306, 308, 310, 312, 314, 316 and 318. These relays have normally open contacts which are connected in the illustrated manner and they serve to store the information introduced to the memory cell. Whenever a unity digit, for example, is introduced to the cell, the top pair of normally open contacts are closed, and they are held closed through a pulse erase unit 320 which may be of the type described in FIGURE 16. The lower normally open contacts of these relays are also closed, in response to the corresponding unity digits. Then, when the relay 294 is energized, the voltages introduced to the buses corresponds to a particular value for a corresponding unity digit, and to a different value for a corresponding "0" digit.

The arithmetic section of the calculator is composed of the relay units illustrated in FIGURES 17–23, and which will now be described. This section is particularly constructed to perform the perspective and orthographic projection operations of the present invention. Multiplications and divisions are independently made and can be carried out at the same time in the arithmetic section, and while other operations are being carried out by the calculator system, as described above. The multiplication unit has a relatively small multiplier register because of the nature of scalings of the projections effectuated by the system.

The division unit of the arithmetic section has the unusual feature of automatically omitting, and null cycling, any division with a negative divisor. This is because such divisions represent points lying behind the observer, as pointed out above. The division unit also has the unusual feature in that it permits the quotient to be directed serially into the output device 26 while it is being produced. This production of the quotient represents the entire output of the system, except for values fed directly from the input tape reader 20, as described above.

The adder unit of the arithmetic section in the calculator is comparatively small because of the nature of scaling in the projection values. Three memory cells only are provided, as mentioned above, these being adequate for the projection operations for most purposes.

Figure 17:
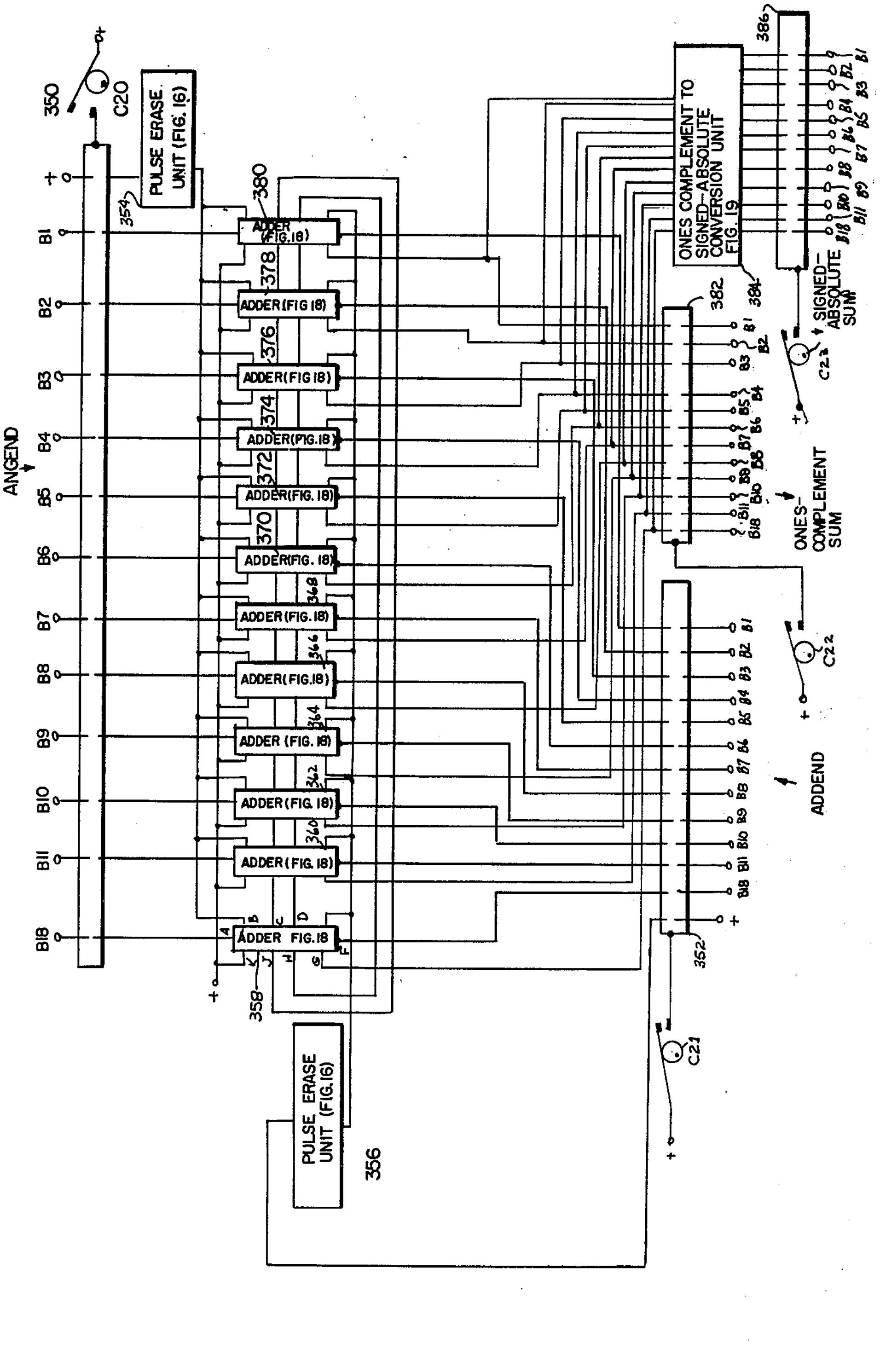
FIGURE 17 is a parallel adder unit used in the calculator system of FIGURE 6.

The parallel adder 136 of FIGURE 6 is shown in more detail in FIGURE 17. This adder, as described above, is made up of two 12-bit registers. The parallel adder also includes a relay 350 and a relay 352. The relay 350 is energized when the cam operated switch C20 is closed, and the augend is read into the relay from a plurality of input terminals designated B1, B2, B3, B4, B5, B6, B7, B8, B9, B10, B11 and B18 respectively. The relay 350 also has a terminal connected to the positive source and to a pulse erase unit 354. The pulse erase unit may be of the type described in conjunction with FIGURE 16. The cam operated switch C20 is timed to close, as mentioned above, when it is desired to insert the augend into the relay 350.

In like manner, the relay 352 receives the addend from respective input terminals B1, B2, B3, B4, B5, B6, B7, B8, B9, B10, B11 and B18. The relay 352 also has a terminal connected to the positive source and to a pulse erase unit 356. The latter pulse erase unit may also be connected in a manner similar to that described in conjunction with FIGURE 16. The relay 352 is under the control of the cam operated switch C21. This switch is timed to energize the relay when it is desired to enter the addend into the relay.

The parallel adder 136 includes a plurality of adders 358, 360, 362, 364, 366, 368, 370, 372, 374, 376, 378 and 380. These latter adders may be connected in a manner to be described in conjunction with FIGURE 18. The different contacts of the relay 350 are connected respectively to the adders enumerated above, as are the respective contacts of the relay 352. The pulse erase unit 354 is also connected to the adders, and they are also connected to the positive terminal of the exciting voltage source, as illustrated. In like manner, the pulse erase unit 356 is connected to the adders, and corresponding output terminals from the adders are connected to a relay 382 and to a one's-complement to signed-absolute conversion unit 384.

The relay 382 stores the ones-complement sum of the addend and augend, and this relay has respective output terminals connected to the buses B1–B11, B18. The relay 382 is controlled by the cam operated switch C22 which is timed to introduce the ones-complement sum to the buses at the desired time.

Figure 19:
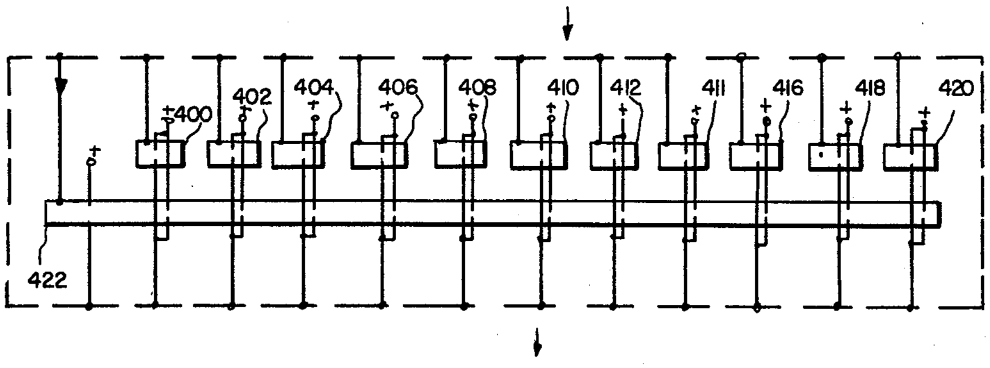
FIGURE 19 is a ones-complement to signed-absolute conversion unit used in the parallel adder unit of FIGURE 17.
Figure 20:
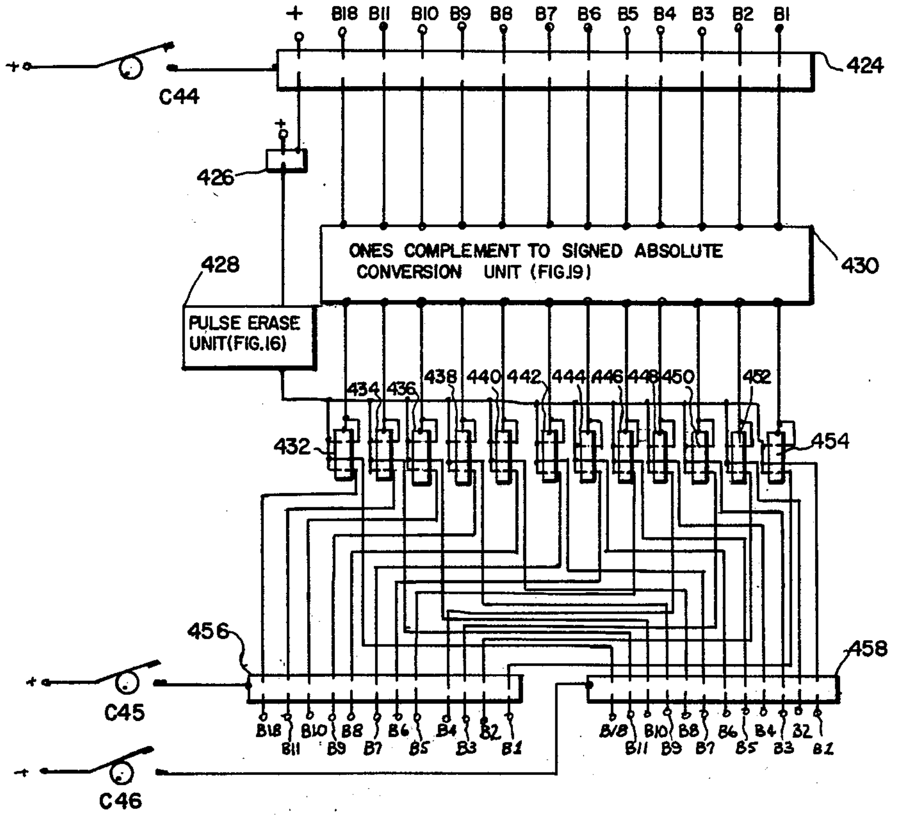
FIGURE 20 is a converter-complementer register used in the calculator system of FIGURE 6.

The ones-complement to the signed-absolute conversion unit 384 is shown in more detail in FIGURE 19. This unit is connected to a relay 386. The relay 386 has output terminals connected to the buses B1–B18, and it is controlled by the cam operated switch C23 to introduce the signed-absolute sum of the addend and the augend to the buses at the proper times.

Figure 18:
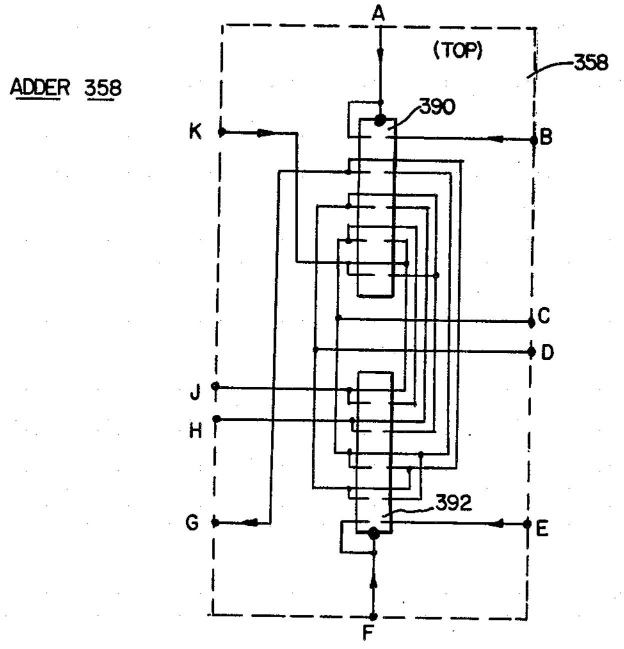
FIGURE 18 is an adder used in the parallel adder unit of FIGURE 17.

The adder 358 of FIGURE 17 is shown in greater detail in FIGURE 18, as mentioned above. It will be understood that the adders 360, 362, 364, 366, 368, 370, 372, 374, 376, 378 and 380 may be similarly constructed.

As shown in FIGURE 18, the adder 358 includes a first relay 390 and a second relay 392. These relays have a plurality of normally open and normally closed contacts, as illustrated. As shown in FIGURE 18, the lead from the relay 350 is connected to the energizing coil of the relay 390 through a terminal indicated A. This causes the relay 390 to be energized whenever a "1" digit appears in the augend at the B18 terminal. Likewise, the lead from the B18 terminal of the relay 352 is connected to the energizing coil of the relay 392. This causes the relay 392 to be energized whenever a unity digit appears in the addend at the B18 terminal.

The pulse erase unit 354 is connected by way of a terminal B to a pair of normally open holding contacts in the relay 390. Likewise, the pulse erase unit 356 is connected by way of the terminal E to a pair of holding contacts in the relay 392. The terminals C and D in FIGURE 18 are connected to respective pairs of normally open and normally closed contacts in the relay 390 and 392, and these leads connect these contacts to similar contacts in the other adders, as shown in FIGURE 17. Likewise, the terminals J and H connect similar contacts in the adder 358 to like contacts in the other adder, as shown in FIGURE 17. The output terminal G in FIGURE 18 connects certain contacts of the relays 390 and 392 to the relay 382 to introduce a "1" to the B18 bus in response to a "1" in the ones-complement sum. The terminal K is connected to the positive terminal of the exciting source to provide an exciting potential to the adders.

The ones-complement to signed-absolute conversion unit 384 is, as noted above, shown in greater detail in FIGURE 19. As illustrated in that figure, each of the input terminals is connected to the energizing coil of a corresponding one of a plurality of relays 400, 402, 404, 406, 408, 412, 414, 416, 418 and 420, that is, with the exception of the left hand "sign" lead, which is connected to the energizing coil of a relay 422.

Each of the relays 400, 402, 404, 406, 408, 410, 412, 414, 416, 418 and 420 includes a pair of normally open contacts and a pair of normally closed contacts which are connected to the positive terminal of the exciting source, and to oppositely conditioned pairs of contacts of the relay 422. The relay 422 also has a pair of contacts at its extreme left hand end which are connected to the positive terminal of the exciting source and to the sign output terminal. The conversion unit 384 serves to convert each of the digits of the sum to its opposite value in response to a unity sign digit. That is, each of the unity digits in the sum cause its corresponding one of the relays 400, 402, 404, 406, 408, 410, 412, 414, 416, 418 and 420 to be energized. Then, when the sign digit is unity, the relay 422 is energized so that a "0" digit appears at its corresponding output C28 connected to its energizing coil. The relays 614, 616 and 618 each include normally open and normally closed contact pairs. These pairs are connected in the illustrated manner to sequentially shift the multiplicand to the right under the control of the cam operated switches C26, C27 and C28. The multiplicand shift register includes a contact D which is connected through a pair of normally open contacts of a relay 620 to the positive terminal B+. This relay, under the control of the successive multiplier digits, determines whether the multiplicand is to be added to the partial product for any particular multiplication step.

Figure 23:
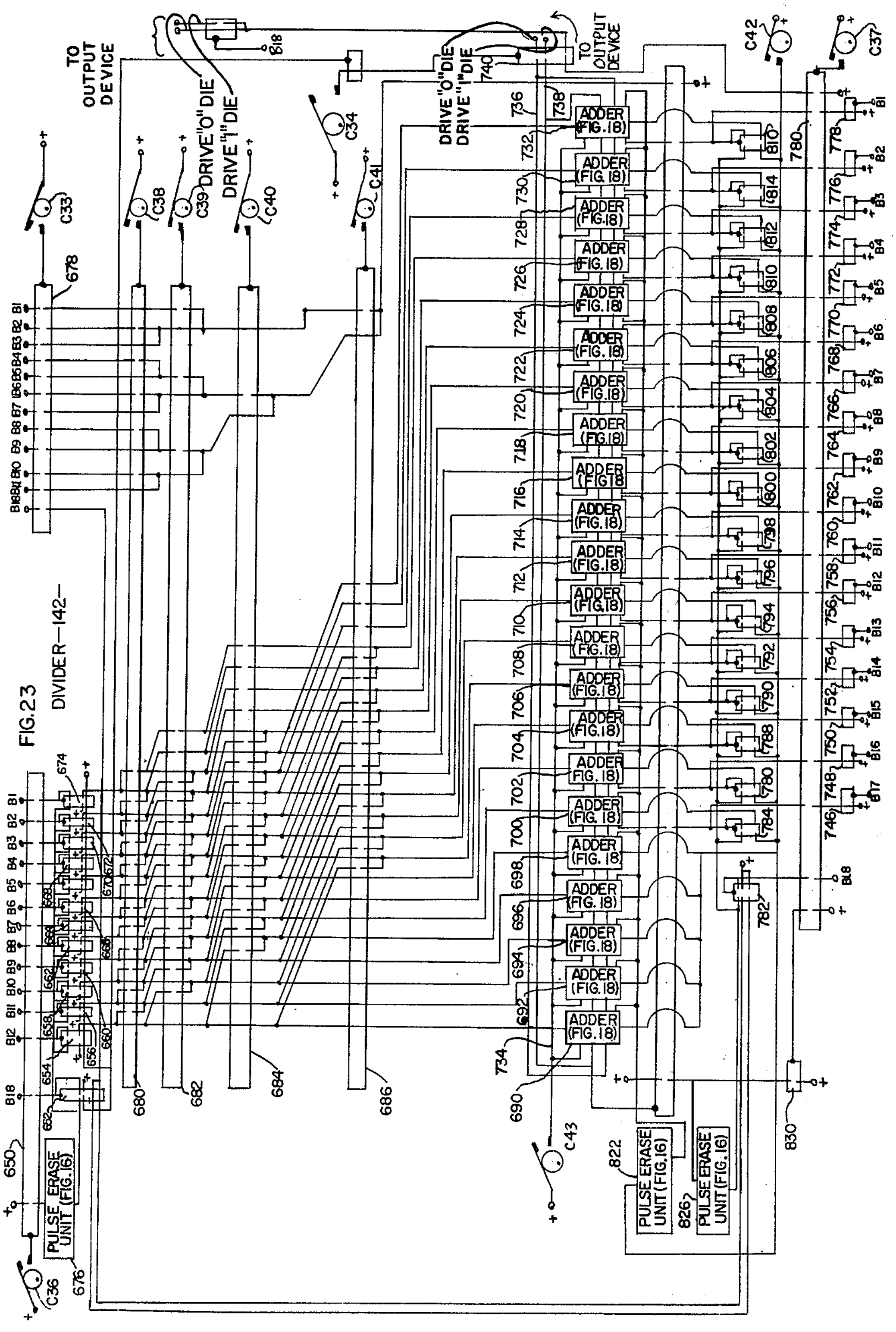
FIGURE 23 is a divider unit used in the calculator system of FIGURE 6.

The divider unit 142 of FIGURE 6 is shown in FIGURE 23. The divisor is fed into the unit from the buses B1–B12, B18 through a relay 650. The energizing of this relay is controlled by the cam operated switch C36 which causes the signed-absolute divisor to be introduced through that relay to a register made up of a group of relays 652, 654, 656, 658, 660, 662, 664, 666, 668, 670, 672 and 674. The relay 650 also has a pair of normally open contacts which are connected to the positive terminal of the exciting source and to a pulse erase unit 676. This pulse erase unit is similar to the unit described in FIGURE 16.

The buses B1–B11, B18 are connected to the contacts of a relay 678. The energizing of the latter relay is controlled by the cam operated switch C33. This latter switch serves to introduce the signed-absolute binary quotient serially to the buses from left to right, and to drive the maximum quotient into the division overflow.

The divider includes a plurality of relays 680, 682, 684 and 686. These relays are connected in the illustrated manner to one another and to the relay registers described above. The relays 680, 682, 684 and 686, under the control of the cam operated switches C38, C39, C40 and C41 serve to shift the divisor to the right during the division process.

The relay 686 is connected to a plurality of adders 690, 692, 694, 696, 698, 700, 702, 704, 706, 708, 710, 712, 714, 716, 718, 720, 722, 724, 726, 728, 730 and 732. These adders may be connected in the manner described in conjunction with FIGURE 18. The adders are connected to a common input lead 734 which is connected through the cam operated switch C43 to the positive terminal of the exciting source. This switch, as mentioned above, introduces the quotient bit and new remaining dividend to the remainder register. The adders are also connected to a pair of common leads 736 and 738. These leads are connected through a pair of normally open contacts of a relay 740 to the output device 26. The energizing of the relay 740 is controlled by the cam operated switch C34. This switch is connected through a pair of normally closed contacts of a relay 742 to the energizing coil of the relay 740. The switch C34 serves to drive the signed-absolute quotient serially to the output device 26, and it writes the sign digit when the dividend is entered and the magnitude bits during division. The sign digit is controlled by the relay 742. The energizing of the latter relay is controlled by the relays 652 and 654 so that the appropriate digit corresponding to the sign may be typed by the output device. This latter introduction is controlled by a relay 744 which is energized whenever a unity digit appears on the sign bus B18.

The divider is entered from the buses B1–B17 through a plurality of relays 746, 748, 750, 752, 754, 756, 758, 760, 762, 764, 766, 768, 770, 772, 774, 776 and 778. These relays are connected to corresponding pairs of normally open contacts in a relay 780. The energizing of the latter relay is controlled by the cam operated switch C37. This switch serves to introduce the dividend from the buses into the divider, the B18 bus is connected directly to a pair of normally open contacts in the relay 780. The normally open contacts of the relay 780 are connected to a plurality of relays 782, 784, 786, 788, 790, 792, 794, 796, 798, 800, 802 804, 806, 808, 810, 812, 814 and 816 which make up the dividend register. These relays are connected to an additional relay 818, and to the adders in the illustrated manner.

The relays of the dividend register are connected to a common lead 820. This lead is selectively connected to the positive terminal of the exciting source by the cam operated switch C42, and this switch serves to introduce the remaining dividend to the adders. The divider includes a first pulse erase unit 822 which is connected to the common lead 820, and which is connected to the adders by way of a common lead 824. The divider includes a second pulse erase unit 826 which is connected to the positive terminal of the exciting source through a pair of normally open contacts of the relay 818, and which is further connected to the relays of the dividend register through a common lead 828. The pulse erase units 822 and 826 may be constructed in the manner described in conjunction with FIGURE 16.

The pulse erase unit 826 is also connected through a pair of normally open contacts of a relay 830 to the positive terminal of the exciting source. The energizing of the relay 830 is controlled by a pair of normally open contacts of the relay 780. The pair of normally open contacts of the relay 740 which are connected to the relay 744, are also connected through a pair of normally open contacts of the relay 780 to the positive terminal B+. This enables the sign digit to be typed by the output device as the dividend is being entered into the dividend register.

The divider of FIGURE 23 proceeds in accordance with known digital principles to perform a division process on the dividend entered into the unit, and in accordance with the divisor which also is entered into the unit in the desired manner. As noted above, the resulting quotient appears in serial form, and it may be introduced to the buses by way of the relay 678 and in a sequence from left to right. Also, as each digit of the quotient is produced, it is introduced to the output device 26 through the relay 740.

If an isometric drawing is desired, the $e_1$, $e_2$ and $e_3$ switches are set to their maximum magnitude, with their signs set to either plus or minus. There are eight different isometric projections of an object, determined by the combination of signs selected for the E-switches. The $a_1$, $a_2$ and $a_3$ switches may always be set to zero, although mere convenience in plotting may require that the coordinates be translated on the final sheet by setting point A to any other value. It is useful to remember that any of the isometric projections turns one body diagonal of a perfect cube to a point. Point G is plotted.

Dimetric drawings may be obtanied by setting the $e_1$, $e_2$ and $e_3$ switches so that none are zero, and so that any two but only two are equal in magnitude (absolute magnitude). The foreshortening of each principal axis is a function of the vector E. The rules for manipulating the A-switches are the same as for isometric drawing; hence the A-switches may be left at zero in every dimetric projection. Point G is plotted.

To obtain correct trimetric projections, which are rarely practiced in the prior art, it is necessary only that the $e_1$, $e_2$ and $e_3$ switches be set to three different magnitudes, none zero. The trimetric projection is otherwise identical to the dimetric projection.

Simple orthographic projections are the trivial orthogonal cases in which two of the E-registers are zero, e.g., $e_2=e_3=0$. There are six possible simple orthographic projections of objects: front, back, top, bottom, right end and left end. The projection obtained is automatically determined by which E-scalar register is not zero, together with the direction of the sign switch associated with it. Point G is plotted.

Auxiliary orthographic drawing may be similarly identerminal in response to the corresponding unity digit at its input terminal.

As described in conjunction with FIGURE 6, the calculator system also includes a converter complementer register 138. This register is shown in more detail in FIGURE 20. This register includes a relay 424 which has a plurality of pairs of normally open contacts. These normally open contacts are connected to respective ones of the buses B1–B11, B18 and a further pair of normally open contacts is connected to the positive terminal of the source of exciting potential. The energizing of the relay 424 is controlled by the cam operated switch C44 which determines when the buses are connected to the converter register 138.

The extreme left hand pair of normally open contacts of the relay 424 are connected to the positive terminal of the exciting source, as mentioned above, and these contacts are also connected to the energizing coil of a relay 426. This latter relay includes a pair of normally open contacts which are connected to a pulse erase unit 428 which may be similar to the unit described in conjunction with FIGURE 16. The remaining pairs of contacts of the relay 424 are connected to a ones-complement to signed-absolute conversion unit 430 which may be similar to the unit 384 described in conjunction with FIGURE 19.

The output terminals of the conversion unit 430 are connected to the energizing coils of respective ones of a plurality of relays 432, 434, 436, 438, 440, 442, 444, 446, 448, 450, 452 and 454. These relays each include two pairs of normally open contacts and a pair of normally closed contacts. All the contacts are connected to the pulse erase unit 428. In addition, one pair of the normally open contacts serve as holding contacts, and the second pair of normally open contacts are connected to a corresponding pair of normally closed contacts of a relay 456. The pair of normally closed contacts of each one of the relays referred to above are connected to a corresponding pair of normally open contacts of a relay 458.

The relay 456 is controlled by the cam operated switch C45. This relay serves to introduce the output from the register 138 to the buses. The output introduced to the buses represents a ones-complement number converted to a signed-absolute, and vice versa. The relay 458 is controlled by the cam operated switch C46. This latter relay introduces an output to the buses which represents a signed-absolute number converted to a ones-complement with the sign changed.

Figure 21:
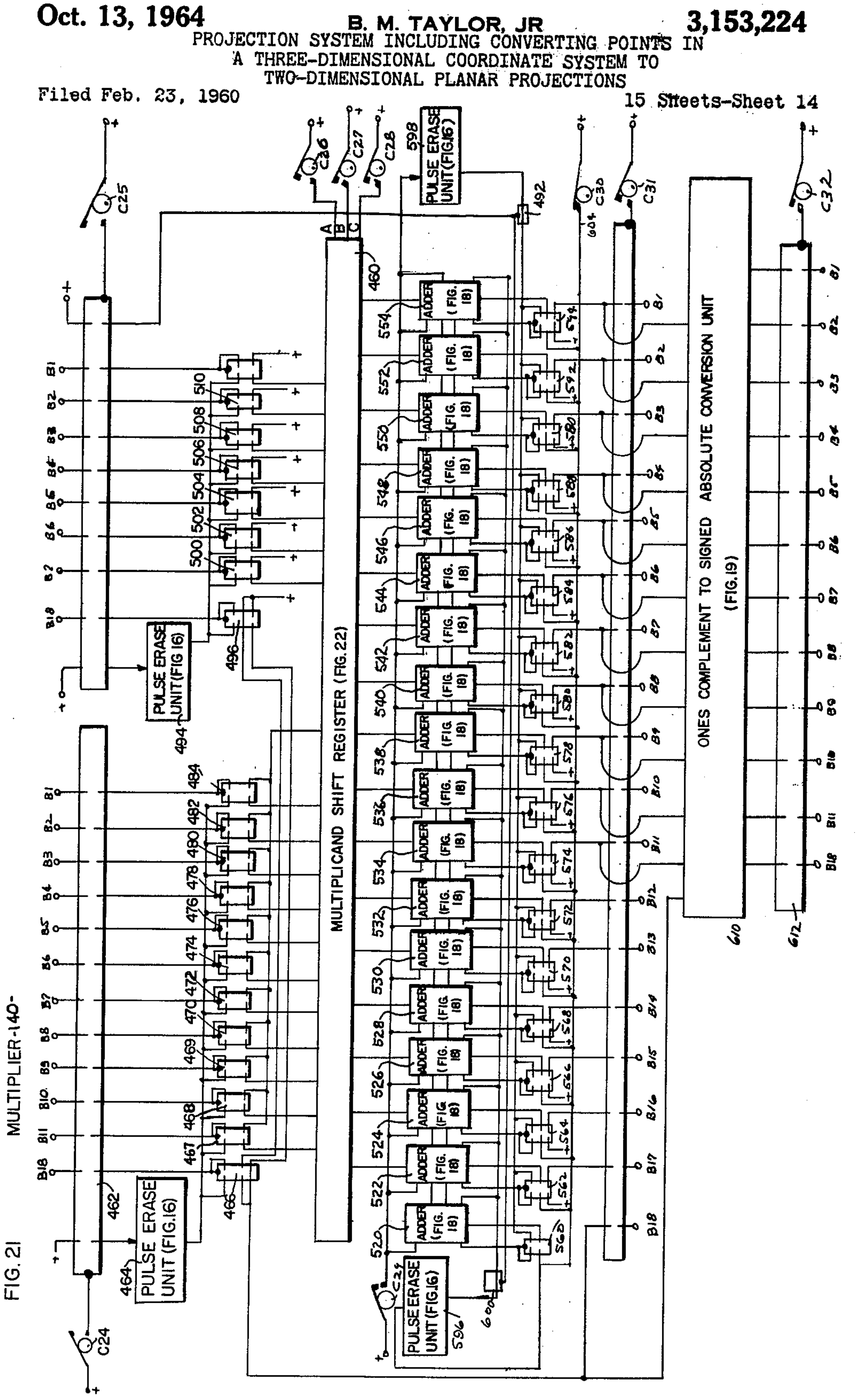
FIGURE 21 is a multiplier used in the calculator system of FIGURE 6.

The multiplier unit 140 of FIGURE 6 is shown in more detail in FIGURE 21. The multiplier includes a multiplicand shift register 460 which is controlled by the cam operated switches C26, C27 and C28. These switches cause the register to shift the multiplicand to the right. The multiplier also includes a relay 462 which has a plurality of normally open contacts connected to respective ones of the buses B1–B11, B18, and which includes an additional pair of normally open contacts which are connected to the positive terminal of the exciting voltage source and to a pulse erase unit 464 which may be similar to the pulse erase unit described in FIGURE 16. The relay 462 is controlled by the cam operated switch 24 which is connected to its energizing coil, and this switch is timed to cause the signed-absolute multiplicand to be introduced by the relay 462 into a plurality of relays 466, 468, 469, 470, 472, 474, 476, 478, 480, 482, 484 and 486. The energizing coils of the latter relays are respectively connected to the contacts of the relay 462, as illustrated.

The multiplier 140 also includes a relay 490. This latter relay has a group of pairs of normally open contacts which are connected to respective ones of the buses B1–B7, B18. The relay also includes a pair of normally open contacts which are connected to the positive terminal of the exciting source and to a relay 492 to perform an automatic clearing function. The relay 490 includes a further pair of normally open contacts which are connected to the positive terminal of the exciting source and to a pulse erase unit 494. The pulse erase unit 494 is constructed in the manner described in FIGURE 16, and it is connected to holding contacts of each of a plurality of relays 496, 498, 500, 502, 504, 506, 508 and 510. The later group of relays have their respective energizing coils connected to the contacts of the relay 490. The energizing coil of the relay 490 is controlled by the cam operated switch C25, and this switch causes that relay to introduce the multiplier from the buses into the register formed by the relays 496, 498, 500, 502, 504, 508 and 510. During this time, the multiplicand is contained in the register formed by the relays 466, 468, 469, 470, 472, 474, 476, 480, 482, 484 and 486. The multiplier register and the multiplicand register, described above, are connected to the multiplicand shift register 460. This register, as noted above, will be described in greater detail in conjunction with FIGURE 22. The output from the multiplicand shift register is introduced to a plurality of adders 520, 522, 524, 526, 528, 530, 532, 534, 536, 538, 540, 542, 544, 546, 548, 550, 552 and 554. These adders may be constructed in a manner similar to the adder described in FIGURE 18. The cam operated switch C29 is connected to these adders, and it serves to cause the adders to add the multiplicand to the partial product if the multiplier idicates that an addition is to be made, in accordance with usual computer multiplication techniques.

The adders described above are also respectively connected in the illustrated manner to the energizing coils of a group of relays 560, 562, 564, 566, 568, 570, 572, 574, 576, 578, 580, 582, 584, 586, 588, 590, 592 and 594. A pair of pulse erase units 596 and 598 are connected into the circuit of these relays in the illustrated manner through the relay 492, and through a relay 600.

Each of the relays 562, 564, 566, 568, 570, 572, 574, 576, 578, 580, 582, 584, 586, 588, 590, 592 and 594 contain a pair of normally open contacts. These contacts are each connected to the positive terminal of the exciting source and to a corresponding pair of normally open contacts of a relay 602. The contacts of the relay 602 are also connected to the buses B1–B17. The relay 602 also has a pair of normally open contacts connected to the B18 bus and to the relays 466 and 96 in the illustrated manner.

The group of relays referred to above each contain a pair of normally open contacts which are connected to respective ones of the adders and to a common lead 604. This common lead is selectively connected to the positive terminal of the exciting source under the control of the cam operated switch C30. This switch, as mentioned above, introduces the partial product to the adders to be added to the multiplicand if the particular multiplier digit so indicates.

The extreme left hand contact pair of the relay 602, together with the 11 right hand contacts of that relay are connected to a ones-complement to signed-absolute conversion unit 610. This unit may have the composition described in conjunction with FIGURE 19. The output terminals of the conversion unit 610 are connected to corresponding ones of a plurality of pairs of normally open contacts in a relay 612. The relay 612 has the cam operated switch C32 connected to its energizing coil, and this relay serves to introduce the ones-complement product to the buses of the calculator system.

Figure 22:
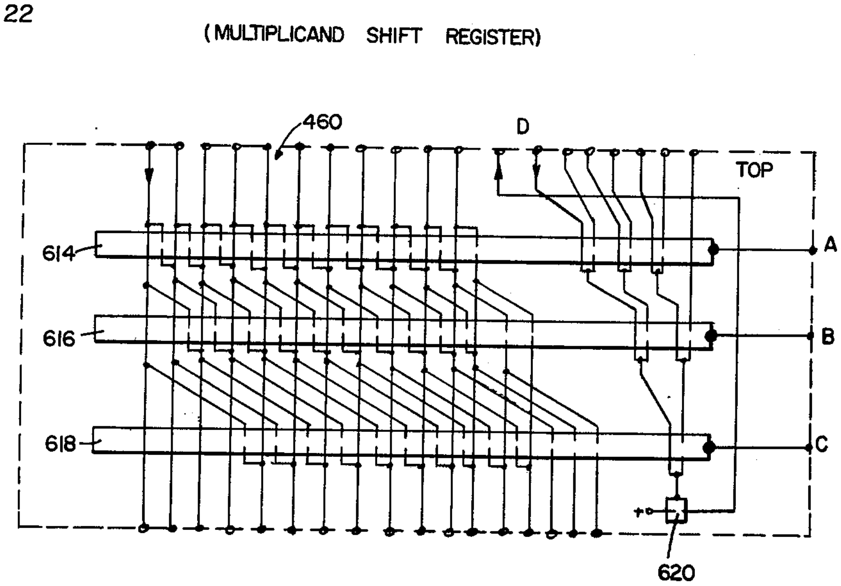
FIGURE 22 is a multiplicand shift register which is included in the multiplier of FIGURE 21.

The multiplicand shift register 460, as shown in FIGURE 22, includes three relays 614, 616 and 618. The relay 614 has the cam operated switch C26 of FIGURE 21 connected to its energizing coil. The relay 616 has the cam operated switch C27 connected to its energizing coil. Finally, the relay 618 has the cam operated switch tified as the case of orthogonal drawing in which the magnitude of only one of the E-scalar switches is set to zero. It is used to shown major faces of objects which are not aligned with any of the original coordinate planes. Point G is plotted. In the relay projector described, the computation of point F may be prevented in orthographic projections by switching point A to a region nearer the picture plane than the object projected; it is convenient in all of these projections to use easy integers for elements in the vector E.

In parallel or one-point perspective drawing, the line of sight AB is parallel to a coordinate axis, and on the final sheet becomes the origin, the primary vanishing point, and a point on the horizon unless $e_3 \neq 0$. Any two and only two of the E-switch registers must be set to zero. Point F is plotted.

For angular or two-point perspective drawing, one and only one of the E-switch registers is set to zero. The main vanishing points, two in number, are co-linear in the pciture plane with the origin. If $e_3$ is zero, the line intersecting these points is the true horizon; otherwise not. Point F is plotted. Angular stereo-optical perspective may be easily obtained.

Oblique or three-point prspective is the most general case of perspective. In this projection aligned rectangular solids yield three vanishing points, of which two must fall on the horizon. Point $B_j$ cannot fall on the horizon. As in isometric, no scalar of E is zero, but for reasons pursuant upon geometric techniques, isometric is common and oblique perspective uncommon in view of the state of the art. Point F is plotted. To make general oblique stereo-optical perspective projections, the tape must be run through the gate twice; this method is discussed in col. 10 line 42.

Pseudoperspective projection preserves the circular cross-sections of cylinders, and is useful where the rendering of ellipses is inefficient and tedious. Pseudoperspective is also presentationally superior to the "oblique" geometric expedients referred to as cabinet and cavalier constructions. The line of sight $A_jB_j$ is chosen parallel to the cylinders themselves, but lies away from them, with point B far from the object but the nearest point in the picture plane. It projects as both origin and primary vanishing point on the final sheet, but is not a center of interest. This projection is, in fact, bona fide one-point perspective. Any two and only two of the E-switch registers must be set to zero. Point F is plotted.

In addition, the projector allows of the arbitrary orthographic and perspective projection of unaligned rectangular solids, swarms of points, amorphous surfaces, successive sections through masses, skewed lines, mapped contour, and the like, without regard for the situation of coordinate planes, nor for grounds, horizons, and vanishing points, nor for the traditional terms such as "dimetric," "angular," and "oblique," which are no more than phylogenetic features of the prior art of the pictorial projections of rectangular solids and elementary figures.

It is held that the invention will assume the prerogatives of the skilled senior draftsman. It is assumed that draftsmen generally will find it easy to record any *i*th swarm points by means of a primitive tape perforator. with the *k*th (*i*th) decisions regarding which points to include being easy for a draftsman who has tried the system, and that the notation of points in Cartesian coordinate systems is trite. Preservation of these *k*th coordinates of any *i*th object to be drawn as an *i*th piece of tape pulled once through a tape gate for one drawing, effectively removes the drudgery of *k*th (*j*th) switching, thereby enhancing the triviality of *j*th (*i*th) drawings of some *i*th object, allowing of extemporaniety in *j*th selections of lines of sight.

Moreover, the $x$, $y$ output of the system, allows of freely plotting the points on sheet laid over an octal cloth, upon which the interpolation of fractions in octal is elementary. A freehand rendering may be made, with no more than a sheet and charcoal, from an arbitrarily primitive although dimensioned specification, without so much as an intermediate orthographic plan.

In the manner described, therefore, the invention provides a perspective or orthographic projection system. The projection system of the invention is most advantageous in that it permits complex objects and contours to be projected into any desired plane. Moreover, it enables this to be accomplished in a simple and expeditious manner, and without the requirement for an artistic skill on the part of the draftsman. The invention is advantageous, moreover, because it may be produced on an economic and low cost basis, and as a result may be sold at a relatively low price.

I claim:

1. A projection system for providing information relative to the coordinates of the projection of selected points with respect to a two-dimensional coordinate system in a selected plane as viewed from a selected observation point; said points individually having coordinates $c_1$, $c_2$, $c_3$, the origin of said two-dimensional ocordinate system having coordinates $b_1$, $b_2$, $b_3$, and the observation point having coordinates $a_1$, $a_2$, $a_3$, all with respect to a particular three-dimensional coordinate system, said projection system including: input means having information recorded therein for successively providing respective multi-digit binary signal indications of the $c_1$, $c_2$, $c_3$ coordinates of successive ones of said points; a first group of two-position switches for providing respective multi-digit binary signal indications of the $a_1$, $a_2$, $a_3$ coordinates of the selected observation point; first input buffer and subtractor means coupled to said input means and to said first group of switches for providing multi-digit binary signals indicative of the terms $(a_1-c_1)$, $(a_2-c_2)$ and $(a_3-c_3)$; a second group of two-position switches for providing multi-digit binary signal indications related to the coordinate $b_1$, $b_2$ and $b_3$; second input buffer means coupled to said second group of switches for providing multi-digit binary signals related to the coordinates $b_1$, $b_2$ and $b_3$; arithmetic computing means; and control means coupled to said first input buffer and to said second input buffer for selectively introducing the multi-digit binary signals therefrom to said arithmetic computing means.

2. The system defined in claim 1 and in which said switches of said first group and of said second group are manually controlled.

3. The system of claim 1 and in which said second group of switches and said second input buffer means provide multi-digit binary signal indications of respective terms $(e_1=a_1-b_1)$, $(e_2=a_2-b_2)$, $(e_3=a_3-b_3)$.

4. The system of claim 1 and in which said control means includes cycling register means for controlling the sequence in which the terms $(a_1-c_1)$, $(a_2-c_2)$ and $(a_3-c_3)$ are introduced from said first input buffer to said arithmetic computing means.

5. The system of claim 3 and in which said control means includes a first cycling register means for controlling the sequence in which the terms $(a_1-c_1)$, $(a_2-c_2)$ and $(a_3-c_3)$ are introduced from said first input buffer to said arithmetic computing means, and in which said control means includes a second cycling register for controlling the sequence in which the terms $(a_1-b_1)$, $(a_2-b_2)$ and $(a_3-b_3)$ are introduced from said second input buffer to said arithmetic means.

6. The system of claim 3 and which includes a third group of two-position switches for providing multi-digit binary signal indications of respective terms $$(d_1=\sqrt{e_1^2+e_2^2+e_3^2})$$

$(d_2=\sqrt{e_1^2+e_2^2}$ or $\sqrt{e_2^2+e_3^2}$—whichever is greater), $(d_4=\sqrt{d_1^2/d_2})$; third buffer means coupled to said third group of switches for producing respective multi-digit binary signals indicative of the terms, $d_1$, $d_2$, $d_4$; and in which said control means is further coupled to said third buffer means for selectively introducing the binary signals therefrom to said arithmetic computing means.

7. A system for responding to the coordinates of any points throughout space and indexed to a selected three-space co-ordinate system and for providing in response thereto corresponding coordinates for said points indexed in a selected plane as observed from a selected observation point, said system including: first means for producing signal indications of the coordinates of any of said points with respect to said selected three-space coordinate system, second means for providing signal indications representing the parameters of said selected plane and of said observation point relative to said selected three-space coordinate system, signal processing means coupled to said first means and tosaid second means and responsive to the signal indications therefrom for providing output signals indicative of the planar coordinates of the projection of such points in the selected plane with respect to a selected planar coordinate system in said plane, and means included in said signal processing means for disabling signal processing means for the production of output signals representative of such points lying behind said observation point.

8. A system for responding to the coordinates of any points throughout space and indexed to a selected three-space coordinate system and for producing in response thereto corresponding coordinates for said points indexed to a selected center point in a selected plane as observed from a selected observation point situated on an axis extending through said center point and perpendicular to said plane, said system including: first means for producing signal indications of the coordinates of any of said points with respect to said selected three-space coordinate system, second means for providing signal indications representing the parameters of said center point in said selected plane and of said observation point relative to said three-space coordinate system, signal processing means coupled to said first means and to said second means and responsive to the signal indications therefrom for providing output signals indicative of the planar coordinates of the projection of such points in the selected plane with respect to a selected planar coordinate system in said plane and centered at said selected center point, means included in said signal processing means for disabling said signal processing means for the production of output signals representing such points lying behind said observation point, and means coupled to said signal processing means responsive to the output signals provided thereby for producing representations of said planar coordinates.

9. A system for responding to the coordinates of any points throughout space and indexed to a selected three-space coordinate system and for providing in response thereto corresponding coordinates for said points indexed to a selected center point in a selected plane as observed from a selected observation point situated at the center of said selected three-space coordinate system and on an axis extending through said center point and perpendicular to said selected plane, said system including: first means for producing signal indications of the coordinates of any of said points with respect to said selected three-space coordinate system, second means for providing signal indications representing the parameters of said center point in the selected plane of said observation point relative to said three-space coordinate system, signal process means coupled to said first means and to said second means and responsive to the signal indications therefrom for providing output signals indicative of the planar coordinates of the projection of such points in the selected plane with respect to a selected planar coordinate system in said plane centered at said center point, means included in said signal processing means for disabling said signal processing means so as to render said signal processing means incapable of producing output signals representing such points having negative coordinates with respect to said axis extending through the center of said three-space coordinate system and through said center point of said selected plane, and means coupled to the signal processing means and responsive to the processed signals provided thereby for producing representations of such planar coordinates.

10. The combination defined in claim 7 and in which said signal processing means provides output signals indicative of the planar coordinates of perspective projections of such points into said selected plane and with respect to the selected planar coordinate system.

11. The combination defined in claim 7 and in which said signal processing means provides output signals indicative of the planar coordinates of the orthographic projections of said points in said particular plane and with respect to said selected planar coordinate system.

12. The combination defined in claim 7 and in which said signal processing means provides a first plurality of output signals indicative of the planar coordinates of the perspective projection of said points of said array into the selected plane and with respect to said selected planar coordinate system, and in which said computing means provides a second plurality of output signals indicative of the planar coordinates of the orthographic projection of said points of said array into the selected plane and with respect to the selected planar coordinate system.

13. A projection system for providing information relative to the coordinates of the projection of selected points with respect to a two-dimensional coordinate system in a selected plane as viewed from a selected observation point; said points individually having coordinates $c_1$, $c_2$, $c_3$, the origin of said two-dimensional coordinate system having coordinates $b_1$, $b_2$, $b_3$, and the observation point having coordinates $a_1$, $a_2$, $a_3$, all with respect to a particular three-dimensional coordinate system, said projection system including: input means having information recorded therein for successively providing respective multi-digit binary signal indications of the $c_1$, $c_2$, $c_3$ coordinates of successive ones of said selected points; control means for providing respective multi-digit binary signal indications of the $a_1$, $a_2$, $a_3$ coordinates of the selected observation point; first input buffer and subtractor means coupled to said input means and to said control means for providing multi-digit binary signals indicative of the terms $(a_1-c_1)$, $(a_2-c_2)$, and $(a_3-c_3)$; further input means for providing multi-digit binary signal indications related to the coordinates $b_1$, $b_2$, and $b_3$; second input buffer means coupled to said further input means for providing multi-digit binary signals related to the coordinates $b_1$, $b_2$ and $b_3$; arithmetic computing means; and control means coupled to said first input buffer means and to said second input buffer means for selectively introducing the multi-digit binary signals therefrom to said arithmetic computing means.

14. The system defined in claim 13 and in which said further input means and said second input buffer means provide multi-digit binary signal indications of respective terms $(e_1=a_1-b_1)$, $(e_2=a_2-b_2)$ and $(e_3=a_3-b_3)$.

15. The system defined in claim 13 and which includes means for rejecting points for which the term $$(a_1-b_1)+(a_1-c_1)+(a_2-b_2)\ (a_2-c_2)+(a_3-b_3)\ (a_3-c_3)$$

is negative.

16. The system defined in claim 13 and which includes further control means for providing multi-digit binary signal indications of respective terms $(d_1=\sqrt{e_1^2+e_2^2+e_3^2})$ $(d_2=\sqrt{e_1^2+e_2^2}$ of $\sqrt{e_2^2+e_3^2}$—whichever is greater), $(d_4=\sqrt{d_1^2/d_2})$; third buffer means coupled to said further control means for producing respective multi-digit binary signals indicative of the terms $d_1$, $d_2$, $d_4$; and in which said control means is further coupled to said third buffer means for selectively introducing the binary signals therefrom to said arithmetic computing means.

References Cited in the file of this patent

UNITED STATES PATENTS

| | | |
|---|---|---|
| 2,648,061 | Parker et al. | Aug. 4, 1953 |
| 3,029,025 | Beek et al. | Apr. 10, 1962 |

OTHER REFERENCES

Weik: "A survey of Domestic Electronic Digital Computing Systems," PB111996 (Ballistic Research Laboratories Report No. 971), Office of Technical Services, United States Department of Commerce, received in U.S. Patent Office 1957, pp. 19, 20 and 123, 124 relied on.